(12) United States Patent
Lin et al.

(10) Patent No.: US 8,310,768 B2
(45) Date of Patent: Nov. 13, 2012

(54) OPTICAL IMAGING LENS SYSTEM

(75) Inventors: Ming Ching Lin, Taichung (TW); Hsin Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 101 days.

(21) Appl. No.: 12/951,428

(22) Filed: Nov. 22, 2010

(65) Prior Publication Data

US 2012/0069455 A1 Mar. 22, 2012

(30) Foreign Application Priority Data

Sep. 16, 2010 (TW) ................................ 99131549 A

(51) Int. Cl.
*G02B 3/02* (2006.01)
*G02B 13/18* (2006.01)
*G02B 9/60* (2006.01)
(52) U.S. Cl. ........................................ 359/714; 359/764
(58) Field of Classification Search .................. 359/708, 359/713, 714, 754–758, 763–766
See application file for complete search history.

(56) References Cited

U.S. PATENT DOCUMENTS

| | | | |
|---|---|---|---|
| 7,365,920 B2 | 4/2008 | Noda | |
| 7,643,225 B1 | 1/2010 | Tsai | |
| 2010/0253829 A1* | 10/2010 | Shinohara | 348/340 |
| 2011/0310494 A1* | 12/2011 | Ise et al. | 359/714 |

* cited by examiner

*Primary Examiner* — Darryl J Collins
(74) *Attorney, Agent, or Firm* — Morris, Manning & Martin, LLP; Tim Tingkang Xia, Esq.

(57) ABSTRACT

This invention provides an optical imaging lens system including five lens elements with refractive power, in order from an object side toward an image side: a first lens element with positive refractive power having a convex object-side surface, a second lens element with negative refractive power, a third lens element having a convex object-side surface and a concave image-side surface, a fourth lens element having both surfaces being aspheric, a fifth lens element having a concave image-side surface with at least one inflection point formed thereon. By such arrangement, the total track length and the sensitivity of the optical imaging lens system can be reduced while achieving high image resolution.

21 Claims, 22 Drawing Sheets

| TABLE 1 | | | | | | | |
|---|---|---|---|---|---|---|---|
| (Embodiment 1) | | | | | | | |
| f = 5.80 mm, Fno = 2.46, HFOV = 33.5 deg. | | | | | | | |
| Surface # | | Curvature Radius | Thickness | Material | Index | Abbe # | Focal length |
| 0 | Object | Plano | Infinity | | | | |
| 1 | Lens 1 | 1.89943 (ASP) | 1.000 | Plastic | 1.544 | 55.9 | 3.29 |
| 2 | | -24.91770 (ASP) | 0.031 | | | | |
| 3 | Ape. Stop | Plano | 0.094 | | | | |
| 4 | Lens 2 | -8.06440 (ASP) | 0.300 | Plastic | 1.632 | 23.4 | -4.29 |
| 5 | | 4.14440 (ASP) | 0.285 | | | | |
| 6 | Lens 3 | 7.79330 (ASP) | 0.571 | Plastic | 1.632 | 23.4 | 18.07 |
| 7 | | 23.83920 (ASP) | 0.729 | | | | |
| 8 | Lens 4 | -2.54592 (ASP) | 0.700 | Plastic | 1.544 | 55.9 | 5.64 |
| 9 | | -1.52615 (ASP) | 0.579 | | | | |
| 10 | Lens 5 | -50.00000 (ASP) | 0.596 | Plastic | 1.530 | 55.8 | -4.30 |
| 11 | | 2.39694 (ASP) | 0.600 | | | | |
| 12 | IR-filter | Plano | 0.300 | Glass | 1.517 | 64.2 | - |
| 13 | | Plano | 0.651 | | | | |
| 14 | Image | Plano | - | | | | |
| Note: Reference wavelength is d-line(587.6 nm) | | | | | | | |

Fig.6

| TABLE 2A | | | | | |
|---|---|---|---|---|---|
| Aspheric Coefficients | | | | | |
| Surface # | 1 | 2 | 4 | 5 | 6 |
| k = | -6.34654E+00 | -6.16054E+01 | -5.53513E+00 | 1.55375E−00 | 0.00000E+00 |
| A4 = | 1.15682E-01 | 3.05485E-02 | 5.50254E-02 | 1.92992E-02 | -5.05834E-02 |
| A6 = | -6.25113E-02 | -2.00147E-02 | -4.86977E-02 | 8.68528E-03 | 9.25408E-03 |
| A8 = | 4.87725E-02 | 3.54138E-03 | 1.28627E-01 | 1.57759E-02 | -1.80768E-02 |
| A10 = | -2.96968E-02 | 3.15697E-02 | -2.27225E-01 | -3.39668E-02 | 1.74151E-02 |
| A12 = | 1.24150E-02 | -4.17317E-02 | 1.96757E-01 | 3.64565E-02 | -4.98360E-03 |
| A14 = | -2.40602E-03 | 1.45640E-02 | -6.70762E-02 | -1.32571E-02 | |
| Surface # | 7 | 8 | 9 | 10 | |
| k = | 0.00000E+00 | 1.44306E+00 | -4.88371E+00 | -1.58160E+01 | |
| A4 = | -1.61410E-02 | 8.81778E-03 | -9.18302E-02 | -4.19634E-02 | |
| A6 = | -9.87868E-03 | 9.40777E-03 | 5.29558E-02 | 4.83610E-03 | |
| A8 = | 5.84595E-03 | -5.51234E-02 | -3.46284E-02 | 8.77080E-04 | |
| A10= | -3.47722E-03 | 5.52798E-02 | 1.21214E-02 | -2.54253E-04 | |
| A12 = | 1.65726E-03 | -2.46465E-02 | -1.56194E-03 | 2.29784E-05 | |
| A14 = | | 4.43061E-03 | 1.76045E-05 | -7.47600E-07 | |

Fig.7A

| TABLE 2B | |
|---|---|
| Aspheric Coefficients | |
| Surface # | 11 |
| k = | -1.02293E+01 |
| A1 = | |
| A2 = | |
| A3 = | |
| A4 = | -3.53015E-02 |
| A5 = | |
| A6 = | 6.43644E-03 |
| A7 = | |
| A8 = | -1.04453E-03 |
| A9= | |
| A10= | 1.01739E-04 |
| A11= | |
| A12= | -5.48497E-06 |
| A13= | |
| A14= | 1.41932E-07 |

Fig.7B

| TABLE 3 | | | | | | | |
|---|---|---|---|---|---|---|---|
| (Embodiment 2) | | | | | | | |
| f = 5.60 mm, Fno = 2.65, HFOV = 34.5 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.320 | | | | |
| 2 | Lens 1 | 1.90349 (ASP) | 0.588 | Plastic | 1.544 | 55.9 | 4.10 |
| 3 | | 11.52250 (ASP) | 0.154 | | | | |
| 4 | Lens 2 | 33.33330 (ASP) | 0.300 | Plastic | 1.650 | 21.4 | -8.43 |
| 5 | | 4.68630 (ASP) | 0.597 | | | | |
| 6 | Lens 3 | 8.76940 (ASP) | 0.300 | Plastic | 1.634 | 23.8 | -46.42 |
| 7 | | 6.66670 (ASP) | 0.562 | | | | |
| 8 | Lens 4 | -2.60861 (ASP) | 0.771 | Plastic | 1.544 | 55.9 | 5.16 |
| 9 | | -1.49262 (ASP) | 0.807 | | | | |
| 10 | Lens 5 | 6.92030 (ASP) | 0.750 | Plastic | 1.544 | 55.9 | -5.34 |
| 11 | | 1.96947 (ASP) | 0.546 | | | | |
| 12 | IR-filter | Plano | 0.300 | Glass | 1.517 | 64.2 | - |
| 13 | | Plano | 0.886 | | | | |
| 14 | Image | Plano | - | | | | |
| Note: Reference wavelength is d-line(587.6 nm) | | | | | | | |

Fig.8

| TABLE 4A | | | | | |
|---|---|---|---|---|---|
| Aspheric Coefficients | | | | | |
| Surface # | 2 | 3 | 4 | 5 | 6 |
| k = | -6.48320E+00 | -1.00000E+00 | -1.00000E+02 | 5.68853E+00 | -2.37763E+02 |
| A4 = | 1.22135E-01 | 2.77831E-02 | 3.68302E-02 | 1.68762E-02 | -7.11416E-02 |
| A6 = | -5.00881E-02 | -4.78108E-03 | -3.96292E-02 | 1.87336E-02 | 4.18906E-03 |
| A8 = | 4.34644E-02 | 8.28051E-04 | 1.30146E-01 | -4.79553E-03 | -2.40069E-02 |
| A10 = | -2.90664E-02 | 3.11734E-02 | -2.35791E-01 | -2.59171E-02 | 1.97092E-02 |
| A12 = | 1.57019E-02 | -4.27291E-02 | 1.95668E-01 | 3.59273E-02 | -4.69557E-03 |
| A14 = | -2.55419E-03 | 1.45633E-02 | -6.70762E-02 | -1.36226E-02 | |
| Surface # | 7 | 8 | 9 | 10 | |
| k = | -6.57985E+01 | 1.73723E+00 | -4.22542E+00 | -2.47745E+00 | |
| A4 = | -5.34629E-02 | 1.85854E-02 | -9.95580E-02 | -4.62534E-02 | |
| A6 = | -8.32085E-03 | 6.44270E-03 | 5.25382E-02 | 4.16983E-03 | |
| A8 = | 6.53173E-03 | -5.72950E-02 | -3.51415E-02 | 8.83828E-04 | |
| A10= | -4.29067E-03 | 5.65445E-02 | 1.19726E-02 | -2.52259E-04 | |
| A12 = | 1.76082E-03 | -2.38146E-02 | -1.55212E-03 | 2.29797E-05 | |
| A14 = | | 4.21484E-03 | 5.62145E-05 | -7.37704E-07 | |

Fig.9A

| TABLE 4B | |
|---|---|
| Aspheric Coefficients | |
| Surface # | 11 |
| k = | -5.47328E+00 |
| A1 = | |
| A2 = | |
| A3 = | |
| A4 = | -3.47185E-02 |
| A5 = | |
| A6 = | 6.40618E-03 |
| A7 = | |
| A8 = | -9.96346E-04 |
| A9= | |
| A10= | 9.97080E-05 |
| A11= | |
| A12 = | -5.59658E-06 |
| A13= | |
| A14= | 1.29976E-07 |

Fig.9B

| TABLE 5 | | | | | | | |
|---|---|---|---|---|---|---|---|
| (Embodiment 3) | | | | | | | |
| f = 5.80 mm, Fno = 2.45, HFOV = 33.5 deg. | | | | | | | |
| Surface # | | Curvature Radius | Thickness | Material | Index | Abbe # | Focal length |
| 0 | Object | Plano | Infinity | | | | |
| 1 | Lens 1 | 1.90805 (ASP) | 0.956 | Plastic | 1.544 | 55.9 | 3.40 |
| 2 | | -47.95110 (ASP) | 0.055 | | | | |
| 3 | Ape. Stop | Plano | 0.080 | | | | |
| 4 | Lens 2 | -9.83980 (ASP) | 0.300 | Plastic | 1.632 | 23.4 | -4.39 |
| 5 | | 3.91250 (ASP) | 0.280 | | | | |
| 6 | Lens 3 | 7.22180 (ASP) | 0.553 | Plastic | 1.632 | 23.4 | 19.36 |
| 7 | | 17.09970 (ASP) | 0.707 | | | | |
| 8 | Lens 4 | -2.53081 (ASP) | 0.705 | Plastic | 1.544 | 55.9 | 6.21 |
| 9 | | -1.58963 (ASP) | 0.650 | | | | |
| 10 | Lens 5 | 5.08270 (ASP) | 0.475 | Plastic | 1.530 | 55.8 | -5.20 |
| 11 | | 1.72971 (ASP) | 0.800 | | | | |
| 12 | IR-filter | Plano | 0.300 | Glass | 1.517 | 64.2 | - |
| 13 | | Plano | 0.615 | | | | |
| 14 | Image | Plano | - | | | | |
| Note: Reference wavelength is d-line(587.6 nm) | | | | | | | |

Fig.10

| TABLE 6A | | | | | |
|---|---|---|---|---|---|
| Aspheric Coefficients | | | | | |
| Surface # | 1 | 2 | 4 | 5 | 6 |
| k = | -6.46334E+00 | 2.65755E-13 | -1.11022E-16 | 1.69323E+00 | 0.00000E+00 |
| A4 = | 1.16204E-01 | 2.98841E-02 | 5.41515E-02 | 1.96251E-02 | -5.24165E-02 |
| A6 = | -6.22966E-02 | -2.17824E-02 | -5.00455E-02 | 7.33857E-03 | 8.91527E-03 |
| A8 = | 4.85745E-02 | 7.39692E-03 | 1.30630E-01 | 1.68545E-02 | -1.73981E-02 |
| A10 = | -2.95349E-02 | 3.01592E-02 | -2.28285E-01 | -3.48149E-02 | 1.77488E-02 |
| A12 = | 1.24716E-02 | -4.17187E-02 | 1.96757E-01 | 3.64565E-02 | -4.99691E-03 |
| A14 = | -2.40594E-03 | 1.45640E-02 | -6.70762E-02 | -1.32571E-02 | |
| Surface # | 7 | 8 | 9 | 10 | |
| k = | 0.00000E+00 | 1.46600E+00 | -4.61349E+00 | -1.00000E-02 | |
| A4 = | -2.03045E-02 | 1.30437E-02 | -8.50424E-02 | -4.46238E-02 | |
| A6 = | -1.08973E-02 | 8.67896E-03 | 5.11604E-02 | 4.88515E-03 | |
| A8 = | 5.79926E-03 | -5.56908E-02 | -3.48049E-02 | 8.78289E-04 | |
| A10= | -2.99682E-03 | 5.51369E-02 | 1.21780E-02 | -2.55191E-04 | |
| A12 = | 1.61183E-03 | -2.46676E-02 | -1.55560E-03 | 2.29272E-05 | |
| A14 = | | 4.55930E-03 | 1.07785E-05 | -7.40515E-07 | |

Fig.11A

| TABLE 6B | |
|---|---|
| Aspheric Coefficients | |
| Surface # | 11 |
| k = | -7.89738E+00 |
| A1 = | |
| A2 = | |
| A3 = | |
| A4 = | -3.75645E-02 |
| A5 = | |
| A6 = | 6.63939E-03 |
| A7 = | |
| A8 = | -1.01903E-03 |
| A9= | |
| A10= | 1.01165E-04 |
| A11= | |
| A12= | -5.61789E-06 |
| A13= | |
| A14= | 1.36808E-07 |

Fig.11B

| TABLE 7 | | | | | | | |
|---|---|---|---|---|---|---|---|
| (Embodiment 4) | | | | | | | |
| f = 5.81 mm, Fno = 2.55, HFOV = 33.5 deg. | | | | | | | |
| Surface # | | Curvature Radius | Thickness | Material | Index | Abbe # | Focal length |
| 0 | Object | Plano | Infinity | | | | |
| 1 | Lens 1 | 1.96849 (ASP) | 1.111 | Plastic | 1.544 | 55.9 | 3.00 |
| 2 | | -7.69230 (ASP) | -0.008 | | | | |
| 3 | Ape. Stop | Plano | 0.098 | | | | |
| 4 | Lens 2 | -6.21570 (ASP) | 0.300 | Plastic | 1.634 | 23.8 | -3.76 |
| 5 | | 3.93370 (ASP) | 0.275 | | | | |
| 6 | Lens 3 | 6.95920 (ASP) | 0.571 | Plastic | 1.634 | 23.8 | 15.03 |
| 7 | | 25.00000 (ASP) | 0.722 | | | | |
| 8 | Lens 4 | -2.64197 (ASP) | 0.795 | Plastic | 1.544 | 55.9 | 5.62 |
| 9 | | -1.56785 (ASP) | 0.441 | | | | |
| 10 | Lens 5 | -10.90650 (ASP) | 0.750 | Plastic | 1.530 | 55.8 | -3.82 |
| 11 | | 2.54913 (ASP) | 0.600 | | | | |
| 12 | IR-filter | Plano | 0.300 | Glass | 1.517 | 64.2 | - |
| 13 | | Plano | 0.515 | | | | |
| 14 | Image | Plano | - | | | | |
| Note: Reference wavelength is d-line(587.6 nm) | | | | | | | |

Fig.12

| TABLE 8A | | | | | |
|---|---|---|---|---|---|
| Aspheric Coefficients | | | | | |
| Surface # | 1 | 2 | 4 | 5 | 6 |
| k = | -6.86987E+00 | -7.79222E+01 | -4.57591E+01 | -2.01300E-01 | -8.09304E+00 |
| A4 = | 1.09295E-01 | 3.44378E-02 | 6.13353E-02 | 1.48989E-02 | -5.21046E-02 |
| A6 = | -6.40432E-02 | -2.16109E-02 | -5.39113E-02 | 1.30427E-02 | 1.41910E-02 |
| A8 = | 4.88201E-02 | -1.22113E-02 | 1.21162E-01 | 1.10230E-02 | -1.78259E-02 |
| A10 = | -3.07742E-02 | 3.91609E-02 | -2.20939E-01 | -3.29129E-02 | 1.47426E-02 |
| A12 = | 1.24233E-02 | -4.17317E-02 | 1.96757E-01 | 3.64565E-02 | -4.98360E-03 |
| A14 = | -2.40602E-03 | 1.45640E-02 | -6.70762E-02 | -1.32571E-02 | |
| Surface # | 7 | 8 | 9 | 10 | |
| k = | 2.28317E+01 | 1.64142E-00 | -5.37259E+00 | -7.55127E+01 | |
| A4 = | -1.78363E-02 | 1.09740E-03 | -9.25910E-02 | -3.96923E-02 | |
| A6 = | -7.15421E-03 | 9.04537E-03 | 5.43950E-02 | 4.79050E-03 | |
| A8 = | 5.92958E-03 | -5.59767E-02 | -3.48307E-02 | 8.61320E-04 | |
| A10= | -3.98119E-03 | 5.54946E-02 | 1.19722E-02 | -2.54895E-04 | |
| A12 = | 1.79620E-03 | -2.44838E-02 | -1.57489E-03 | 2.29492E-05 | |
| A14 = | | 4.40975E-03 | 3.21918E-05 | -7.39144E-07 | |

Fig.13A

| TABLE 8B | |
|---|---|
| Aspheric Coefficients | |
| Surface # | 11 |
| k = | -1.18779E+01 |
| A1 = | |
| A2 = | |
| A3 = | |
| A4 = | -3.15738E-02 |
| A5 = | |
| A6 = | 6.22185E-03 |
| A7 = | |
| A8 = | -1.05449E-03 |
| A9= | |
| A10= | 1.01948E-04 |
| A11= | |
| A12= | -5.47566E-06 |
| A13= | |
| A14= | 1.37438E-07 |

Fig.13B

| TABLE 9 | | | | | | | |
|---|---|---|---|---|---|---|---|
| (Embodiment 5) | | | | | | | |
| f = 5.59 mm, Fno = 2.80, HFOV = 33.4 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.297 | | | | |
| 2 | Lens 1 | 1.77864 (ASP) | 0.563 | Plastic | 1.544 | 55.9 | 4.17 |
| 3 | | 7.30960 (ASP) | 0.176 | | | | |
| 4 | Lens 2 | -11.58280 (ASP) | 0.300 | Plastic | 1.650 | 21.4 | -7.57 |
| 5 | | 8.63590 (ASP) | 0.348 | | | | |
| 6 | Lens 3 | 3.37290 (ASP) | 0.448 | Plastic | 1.544 | 55.9 | 12.76 |
| 7 | | 6.25000 (ASP) | 0.853 | | | | |
| 8 | Lens 4 | -2.46993 (ASP) | 0.881 | Plastic | 1.544 | 55.9 | 5.38 |
| 9 | | -1.50761 (ASP) | 0.650 | | | | |
| 10 | Lens 5 | -4.46860 (ASP) | 0.750 | Plastic | 1.544 | 55.9 | -3.50 |
| 11 | | 3.51260 (ASP) | 0.464 | | | | |
| 12 | IR-filter | Plano | 0.300 | Glass | 1.517 | 64.2 | - |
| 13 | | Plano | 0.528 | | | | |
| 14 | Image | Plano | - | | | | |
| Note: Reference wavelength is d-line(587.6 nm) | | | | | | | |

Fig.14

| TABLE 10 | | | | | |
|---|---|---|---|---|---|
| Aspheric Coefficients | | | | | |
| Surface # | 2 | 3 | 4 | 5 | 6 |
| k  = | -5.61471E+00 | -4.41558E+01 | -1.00000E+00 | -5.66545E-01 | 0.00000E+00 |
| A4 = | 1.28896E-01 | 2.88829E-02 | 3.64430E-02 | 2.27482E-02 | -5.34376E-02 |
| A6 = | -5.72840E-02 | -1.23890E-02 | -4.53896E-02 | 1.94426E-02 | 1.69754E-02 |
| A8 = | 5.50865E-02 | -5.44209E-03 | 1.28651E-01 | 1.34606E-05 | -2.60271E-02 |
| A10 = | -4.08714E-02 | 2.73868E-02 | -2.33655E-01 | -2.21409E-02 | 1.75133E-02 |
| A12 = | 1.85002E-02 | -4.27291E-02 | 1.95668E-01 | 3.59273E-02 | -3.72919E-03 |
| A14 = | -2.55419E-03 | 1.45633E-02 | -6.70762E-02 | -1.36226E-02 | |
| Surface # | 7 | 8 | 9 | 10 | 11 |
| k  = | 0.00000E+00 | 2.25155E+00 | -3.87820E+00 | -9.47849E+00 | -1.01819E+01 |
| A4 = | -2.56074E-02 | -3.14936E-02 | -9.91308E-02 | -2.30718E-02 | -3.06157E-02 |
| A6 = | -1.78841E-02 | 2.45760E-02 | 5.50931E-02 | 3.49813E-03 | 6.42861E-03 |
| A8 = | 5.28098E-03 | -6.25447E-02 | -3.44798E-02 | 7.87553E-04 | -1.02679E-03 |
| A10= | -4.08200E-03 | 5.48186E-02 | 1.19502E-02 | -2.64157E-04 | 1.00885E-04 |
| A12 = | 1.01819E-03 | -2.42459E-02 | -1.59154E-03 | 2.28026E-05 | -5.57937E-06 |
| A14 = | | 3.96009E-03 | 3.69954E-05 | -6.58712E-07 | 1.16110E-07 |

Fig.15

| TABLE 11 | | | | | |
|---|---|---|---|---|---|
| | Embodiment 1 | Embodiment 2 | Embodiment 3 | Embodiment 4 | Embodiment 5 |
| f | 5.80 | 5.60 | 5.80 | 5.81 | 5.59 |
| Fno | 2.46 | 2.65 | 2.45 | 2.55 | 2.80 |
| HFOV | 33.5 | 34.5 | 33.5 | 33.5 | 33.4 |
| V1-V2 | 32.5 | 34.5 | 32.5 | 32.1 | 34.5 |
| T23/CT2 | 0.95 | 1.99 | 0.93 | 0.92 | 1.16 |
| CT4/CT5 | 1.17 | 1.03 | 1.48 | 1.06 | 1.17 |
| R1/R2 | -0.08 | 0.17 | -0.04 | -0.26 | 0.24 |
| f/f3 | 0.32 | -0.12 | 0.30 | 0.39 | 0.44 |
| f/f1-f/f4 | 0.73 | 0.28 | 0.77 | 0.90 | 0.30 |
| |f/f4|+|f/f5| | 2.38 | 2.13 | 2.05 | 2.55 | 2.64 |
| SAG42/Y42 | 0.56 | 0.59 | 0.56 | 0.54 | 0.58 |
| SL/TTL | 0.84 | 0.95 | 0.84 | 0.83 | 0.95 |
| TTL/ImgH | 1.64 | 1.67 | 1.65 | 1.65 | 1.67 |

Fig.16

OPTICAL IMAGING LENS SYSTEM

CROSS-REFERENCE TO RELATED APPLICATIONS

This non-provisional application claims priority under 35 U.S.C. §119(a) on Patent Application No(s). 099131549 filed in Taiwan, R.O.C. on Sep. 16, 2010, the entire contents of which are hereby incorporated by reference.

BACKGROUND OF THE INVENTION

1. Field of the Invention

The present invention relates to an optical imaging lens system, and more particularly, to a compact optical imaging lens system used in a portable electronic product.

2. Description of the Prior Art

The demand for compact imaging lens assembly has grown in recent years as the popularity of portable electronic products with the photographing function has increased, and the sensor of a general photographing camera is none other than CCD (Charge Coupled Device) or CMOS (Complementary Metal Oxide Semiconductor Sensor). Furthermore, as advanced semiconductor manufacturing technology has allowed the pixel size of sensors to be reduced, and the resolution of compact imaging lenses has gradually increased, there is an increasing demand for compact imaging lens assembly featuring better image quality.

A conventional compact imaging lens assembly for portable electronic products generally comprises four lens elements, as the one disclosed in U.S. Pat. No. 7,365,920, wherein two spherical-surface glass lenses serving as the first and second lens elements are adhered together to form a doublet and thereby to correct the chromatic aberration. Such an arrangement of optical elements, however, has the following disadvantages: (1) the freedom of the system is curtailed due to the employment of excess number of spherical-surface glass lenses, thus the total track length of the system cannot be reduced easily; (2) the process of adhering glass lenses together is complicated, posing difficulties in manufacture. In addition, a four independent lens elements optical system is disclosed by U.S. Pat. No. 7,643,225, comprising multiple aspheric lens elements, which effectively shortens the total track length and obtains high image quality.

However, due to the popularity of high standard mobile devices such as smart phones and PDAs (Personal Digital Assistant) driving the rapid improvements in high resolution and image quality of the compact imaging lens systems, conventional four lens elements systems no longer satisfy the higher level camera modules. Furthermore, with the current trend for high performance and compact design in electronic products, the need for high resolution and high performance compact imaging optical lens system is very crucial in high level electronics development.

Therefore, a need exists in the art for an optical image lens system that features better image quality, maintains a moderate total track length and is applicable to compact portable electronic products.

SUMMARY OF THE INVENTION

The present invention provides an optical imaging lens system comprising five lens elements with refractive power, in order from an object side to an image side: a first lens element with positive refractive power having a convex object-side surface; a second lens element with negative refractive power; a third lens element having a convex object-side surface and a concave image-side surface; a fourth lens element having both surface being aspheric; and a fifth lens element having a concave image-side surface with at least one inflection point formed thereon; wherein a thickness of the fourth lens element on the optical axis is CT4, a thickness of the fifth lens element on the optical axis is CT5, a distance on the optical axis between the stop and the electronic sensor is SL, a distance on the optical axis between the object-side surface of the first lens element and the electronic sensor is TTL, and they satisfy the relation: $0.8<CT4/CT5<1.5$; and $0.7<SL/TTL<1.1$.

In an optical imaging lens system of the present invention, the first lens element has positive refractive power, which provides part of the refractive power for the system and helps to reduce the total track length of the lens system. The second lens element has negative refractive power, which allows the aberration produced by the first lens element with positive refractive power to be effectively corrected, as well as allows the chromatic aberration of the system to be favorably corrected. The third lens element may have either negative or positive refractive power. When the third lens element has negative refractive power, the Petzval Sum of the system can be corrected favorably and the peripheral image field becomes flatter; when the third lens element has positive refractive power, the high-order aberration can be effectively corrected.

In an optical imaging lens system of the present invention, the first lens element may be a bi-convex lens element or a meniscus lens element having a convex object-side surface and a concave image-side surface. When the first lens element is a bi-convex lens element, a distribution of the refractive power thereof can be effectively improved, thereby reducing the total track length of the lens system; when the first lens element is a convex-concave meniscus lens element, the astigmatism of the system can be corrected favorably. The third lens element has a convex object-side surface and a concave image-side surface, which allows the aberration of the system to be effectively corrected and improves for correcting the astigmatism of the system. The fifth lens element has a concave image-side surface so that the principal point of the optical system can be positioned even farther away from the image plane for reducing the total track length of the system and keeping the system compact. Moreover, the fifth lens element is provided with at least one inflection point, thereby the angle at which the light is projected onto the sensor from the off-axis field can be effectively reduced for further correcting the off-axis aberration.

By such an arrangement, the total track length and the sensitivity of the optical imaging lens system can be reduced while further achieving higher image resolution.

BRIEF DESCRIPTION OF THE DRAWINGS

FIG. 6 is TABLE 1 which lists the optical data of the first embodiment.

FIGS. 7A and 7B are TABLEs 2A and 2B respectively which list the aspheric surface data of the first embodiment.

FIG. 8 is TABLE 3 which lists the optical data of the second embodiment.

FIGS. 9A and 9B are TABLEs 4A and 4B respectively which list the aspheric surface data of the second embodiment.

FIG. 10 is TABLE 5 which lists the optical data of the third embodiment.

FIGS. 11A and 11B are TABLEs 6A and 6B respectively which list the aspheric surface data of the third embodiment.

FIG. 12 is TABLE 7 which lists the optical data of the fourth embodiment.

FIGS. 13A and 13B are TABLEs 8A and 8B respectively which list the aspheric surface data of the fourth embodiment.

FIG. 14 is TABLE 9 which lists the optical data of the fifth embodiment.

FIG. 15 is TABLE 10 which lists the aspheric surface data of the fifth embodiment.

FIG. 16 is TABLE 11 which lists the data of the respective embodiments resulting from the equations.

DETAILED DESCRIPTION OF THE PREFERRED EMBODIMENTS

Figure 1A:
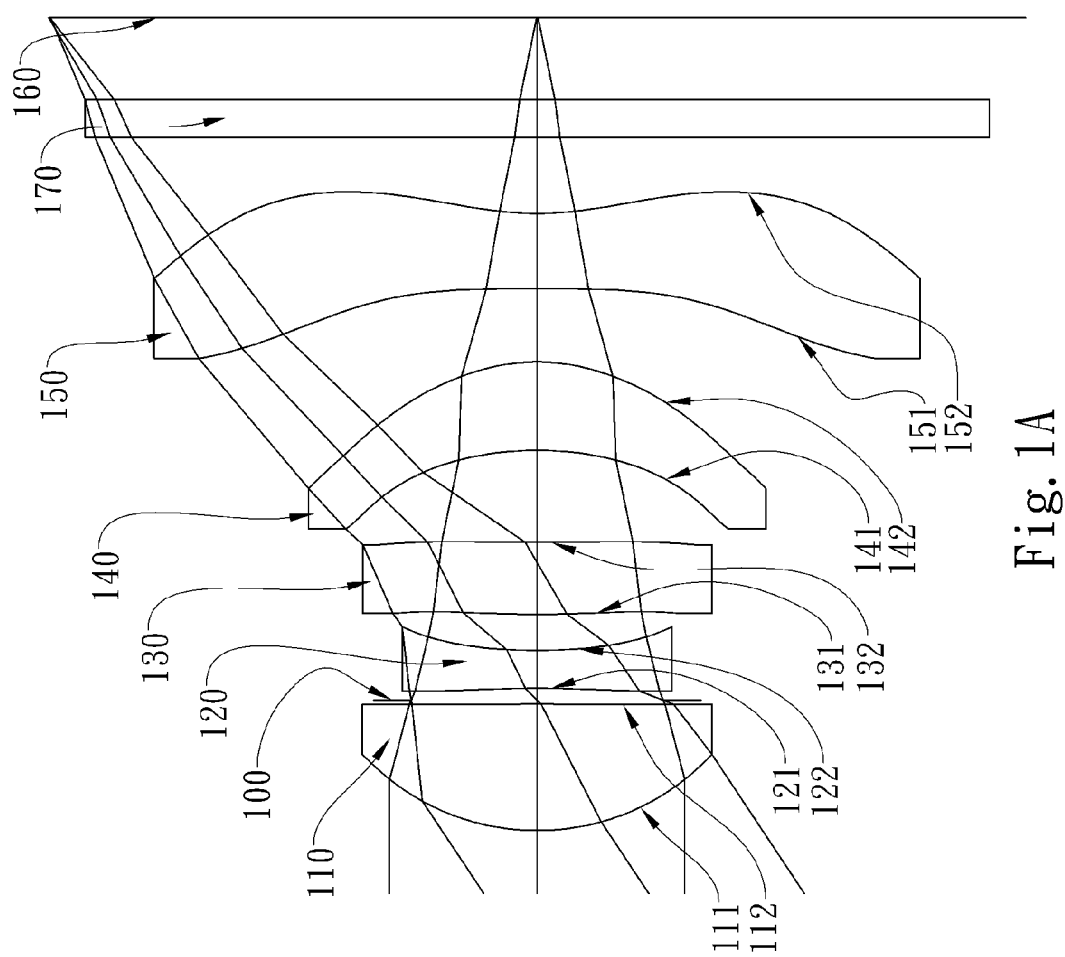
FIG. 1A shows an optical imaging lens system in accordance with a first embodiment of the present invention.

The present invention provides an optical imaging lens system comprising five lens elements with refractive power, in order from an object side to an image side: a first lens element with positive refractive power having a convex object-side surface; a second lens element with negative refractive power; a third lens element having a convex object-side surface and a concave image-side surface; a fourth lens element having both surface being aspheric; and a fifth lens element having a concave image-side surface with at least one inflection point formed thereon; wherein a thickness of the fourth lens element on the optical axis is CT4, a thickness of the fifth lens element on the optical axis is CT5, a distance on the optical axis between the stop and the electronic sensor is SL, a distance on the optical axis between the object-side surface of the first lens element and the electronic sensor is TTL, and they satisfy the relation: 0.8<CT4/CT5<1.5; and 0.7<SL/TTL<1.1.

When the relation of 0.8<CT4/CT5<1.5 is satisfied, the thickness of the fourth and fifth lens elements are not large or small excessively, and thereby the lens elements can be favorably assembled and arranged.

When the relation of 0.7<SL/TTL<1.1 is satisfied, a fine balance between the telecentricity and a wide field of view of the lens system can be favorably achieved. Further preferably, the following relation is satisfied: 0.8<SL/TTL<1.0.

In the aforementioned optical imaging lens system, it is preferable that the second lens element has a concave image-side surface so that the back focal length of the system is effectively increased to ensure that the system has enough back focal length for arranging other elements; it is preferable that an inflection point is formed on the third lens element so that the angle at which light is projected onto the sensor from the off-axis field can be effectively reduced, thereby further correcting the off-axis aberration. It is preferable that the fourth lens element is a meniscus lens element having a concave object-side surface and a convex image-side surface so that the astigmatism of the system can be corrected favorably. Besides, an air clearance is existed between each lens elements so that the difficulty of lens assembling can be prevented.

In the aforementioned optical imaging lens system, a focal length of the optical imaging lens system is f, a focal length of the third lens element is f3, and they preferably satisfy the relation: −0.5<f/f3<0.6. When the above relation is satisfied, the refractive power of the third lens element is more appropriate so that the aberration of the first lens element can be corrected favorably, thereby to prevent the refractive power of any single lens element from becoming too large and to attenuate the sensitivity of the optical system effectively; Further preferably, the following relation is satisfied: −0.2<f/f3<0.5.

In the aforementioned optical imaging lens system, a focal length of the optical imaging lens system is f, a focal length of the fourth lens element is f4, a focal length of the fifth lens element is f5, and they preferably satisfy the relation: 1.8<|f/f4|+|f/f5|<3.0. When the above relation is satisfied, the refractive power of the fourth and fifth lens elements are more balanced so that the sensitivity of the system and the aberration can be favorably attenuated.

In the aforementioned optical imaging lens system, the radius of curvature of the object-side surface of the first lens element is R1, the radius of curvature of the image-side surface of the first lens element is R2, and they preferably satisfy the relation: −0.3<R1/R2<0.3. The satisfaction of the above relation facilitates the correction of the spherical aberration of the optical system.

In the aforementioned optical imaging lens system, the intersection of the image-side surface of the fourth lens element and the optical axis is T2, the farthest point of the effective light entry area on the image-side surface of the fourth lens element is P2, the distance on the optical axis between T2 and the vertical projection of P2 on the optical axis is SAG42, the vertical distance between P2 and the optical axis is Y42, and they preferably satisfy the relation: 0.4<SAG42/Y42<0.7. When the above relation is satisfied, the shape of the fourth lens element is not excessively curved, which is good for the fabrication and formation of lens elements and the reduction of space needed for arranging the lens elements of the system so that the arrangement of the system can be more compact.

In the aforementioned optical imaging lens system, a focal length of the optical imaging lens system is f, a focal length of the first lens element is f1, a focal length of the fourth lens element is f4, and they preferably satisfy the relation: 0<f/f1−f/f4<1.5. When the above relation is satisfied, the refractive power of the first and fourth lens elements are more balanced so that the sensitivity of the system and the aberration can be favorably attenuated.

In the aforementioned optical imaging lens system, an Abbe number of the first lens element is V1, an Abbe number of the second lens element is V2, and they preferably satisfy the relation: 30<V1−V2<42. When the above relation is satisfied, the chromatic aberration of the optical imaging lens system can be favorably corrected.

In the aforementioned optical imaging lens system, an on-axis spacing between the second lens element and the third lens element is T23, a thickness of the second lens element on the optical axis is CT2, and they preferably satisfy the relation: 0.9<T23/CT2<2.0. When the above relation is satisfied, the spacing between lens elements of the system will be appropriate, thereby is not only favorable for arrangement of lens elements, but also more efficient in use of space for keeping the lens system compact.

In the aforementioned optical imaging lens system, a distance on the optical axis between the object-side surface of the first lens element and the electronic sensor is TTL, half of the diagonal length of the effective pixel area of the electronic sensor is ImgH, and they preferably satisfy the relation: TTL/ImgH<1.80. The satisfaction of the above relation is favorably for keeping the optical imaging lens system compact so that the optical imaging lens system can be installed in compact electronic products.

The present invention provides another optical imaging lens system comprising five lens elements with refractive power, in order from an object side to an image side: a first lens element with positive refractive power having a convex object-side surface; a second lens element with negative refractive power; a third lens element having a concave image-side surface; a fourth lens element with positive refractive power, at least one of the object-side and image-side surfaces thereof being aspheric; and a fifth lens element with negative refractive power having a concave image-side surface, and at least one of the object-side and image-side surfaces thereof being aspheric; wherein a focal length of the optical imaging lens system is f, a focal length of the fourth lens element is f4, a focal length of the fifth lens element is f5, an on-axis spacing between the second lens element and the third lens element is T23, a thickness of the second lens element on the optical axis is CT2, a distance on the optical axis between the stop and the electronic sensor is SL, a distance on the optical axis between the object-side surface of the first lens element and the electronic sensor is TTL, and they satisfy the relation: 1.8<|f/f4|+|f/f5|<3.0; 0.7<T23/CT2<2.5; and 0.7<SL/TTL<1.1.

When the relation of 1.8<|f/f4|+|f/f5|<3.0 is satisfied, the refractive power of the fourth and fifth lens elements are more balanced so that the sensitivity of the system and the aberration can be favorably attenuated.

When the relation of 0.7<T23/CT2<2.5 is satisfied, the spacing between lens elements and the thickness of the lens are not excessively large or small.

Consequently it is not only favorable for lens system assembling but also more efficient in the usage of space for keeping the system compact.

When the relation of 0.7<SL/TTL<1.1 is satisfied, a good balance between the telecentricity and a wide field of view of the lens system can be favorably achieved.

In the aforementioned optical imaging lens system, the fourth lens element has positive refractive power, which can distribute the positive refractive power of the first lens element effectively so that the sensitivity of the system is reduced; the fifth lens element has negative refractive power so that the principal point of the optical system can be positioned far away from the image plane, and the total track length of the system is favorably reduced to keep the lens system compact.

In the aforementioned optical imaging lens system, the third lens element has a concave image-side surface so that the back focal length of the system is increased; it is preferable that the third lens element has a convex object-side surface, that is, the third lens element is a meniscus lens element having a convex object-side surface and a concave image-side surface. It can favorably achieve a balance between the increase of the back focal length of the system and the reducing of the total track length of the lens system, and also allows the aberration of the system being corrected effectively; it is preferable that the fourth lens element has a concave object-side surface and a convex image-side surface so that the astigmatism of the system can be corrected favorably. It is further preferable that the third and fifth lens elements are provided with at least one inflection point, thereby the angle at which the light is projected onto the sensor from the off-axis field can be effectively reduced to further correct the aberration of off-axis field.

In the aforementioned optical imaging lens system, a focal length of the optical imaging lens system is f, a focal length of the third lens element is f3, and they preferably satisfy the relation: −0.5<f/f3<0.6. When the above relation is satisfied, the refractive power of the third lens element is more appropriate so that the astigmatism of the first lens element can be corrected favorably, and the refractive power of any single lens element is not large excessively, thereby the sensitivity of the optical system is attenuated favorably; Further preferably, the following relation is satisfied: −0.2<f/f3<0.5.

In the aforementioned optical imaging lens system, a thickness of the fourth lens element on the optical axis is CT4, a thickness of the fifth lens element on the optical axis is CT5, and they preferably satisfy the relation: 0.8<CT4/CT5<1.5. When the above relation is satisfied, a space between the lens elements of the system is not large or small excessively which is not only favorable for arrangement of lens elements but also more efficient in the usage of space for keeping the lens system compact.

In the aforementioned optical imaging lens system, the intersection of the image-side surface of the fourth lens element and the optical axis is T2, the farthest point of the effective light entry area on the image-side surface of the fourth lens element is P2, the distance on the optical axis between T2 and the vertical projection of P2 on the optical axis is SAG42, the vertical distance between P2 and the optical axis is Y42, and they preferably satisfy the relation: 0.4<SAG42/Y42<0.7. When the above relation is satisfied, the shape of the fourth lens element is not excessively curved, which is good for the fabrication and formation of lens elements and the reduction of space needed for arranging the lens elements of the system so that the arrangement of the system can be more compact.

In the aforementioned optical imaging lens system, a focal length of the optical imaging lens system is f, a focal length of the first lens element is f1, a focal length of the fourth lens element is f4, and they preferably satisfy the relation: 0<f/f1−f/f4<1.5. When the above relation is satisfied, the refractive power of the first and fourth lens elements are more balanced so that the sensitivity of the system and the aberration can be favorably attenuated.

In the aforementioned optical imaging lens system, the lens elements can be made of glass or plastic material. If the lens elements are made of glass, there is more freedom in distributing the refractive power of the optical system. If plastic material is adopted to produce the lens elements, the production cost will be reduced effectively. Additionally, the surfaces of the lens elements can be aspheric and easily made into non-spherical profiles, allowing more design parameter freedom which can be used to reduce the aberration and the number of the lens elements. Consequently, the total track length of the optical imaging lens system can be effectively reduced.

In the present optical imaging lens system, if a lens element has a convex surface, it means the portion of the surface in proximity to the optical axis is convex; if a lens element has a concave surface, it means the portion of the surface in proximity to the optical axis is concave.

Preferred embodiments of the present invention will be described in the following paragraphs by referring to the accompanying drawings.

Embodiment 1

Figure 1B:
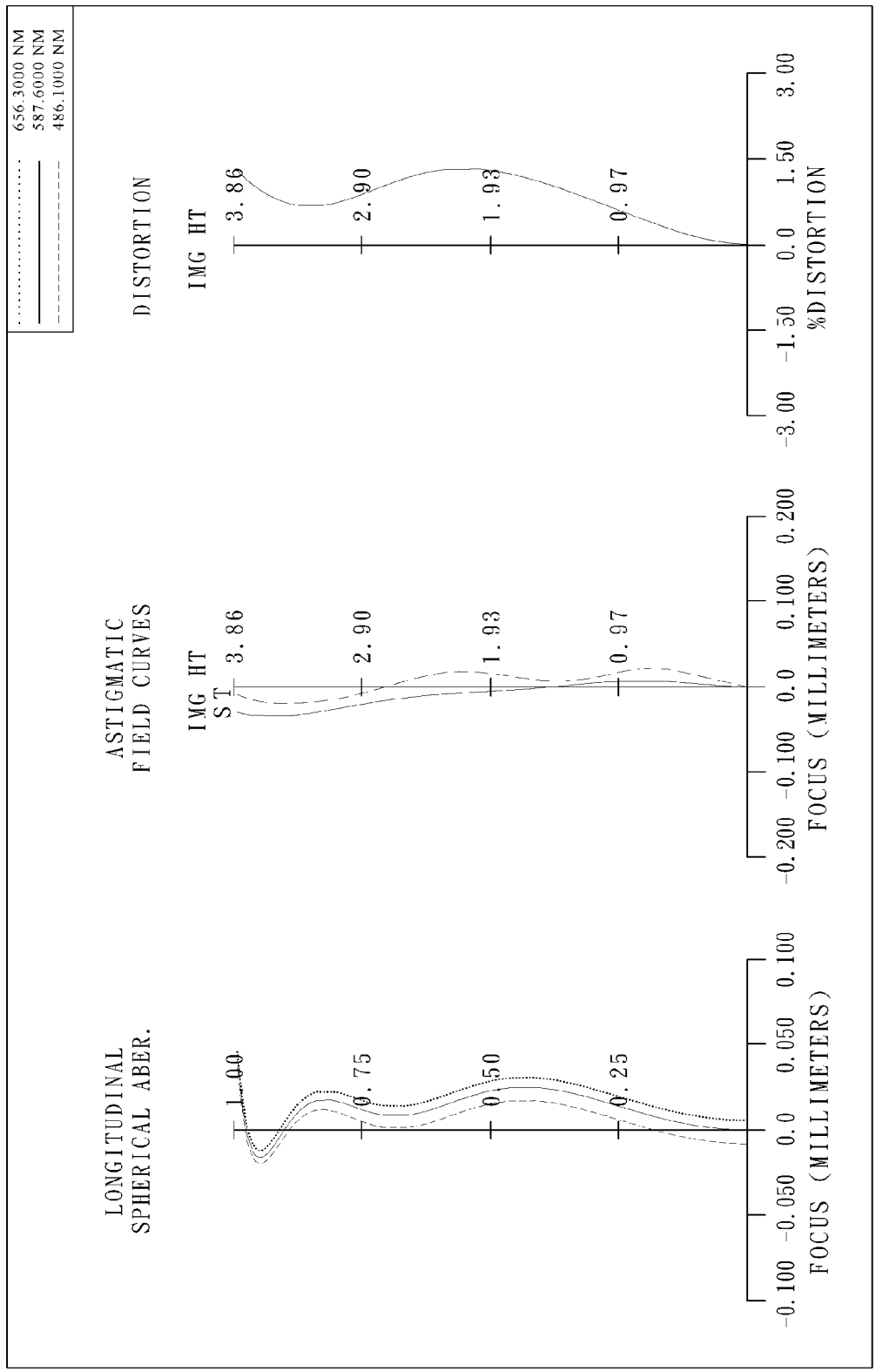
FIG. 1B shows the aberration curves of the first embodiment of the present invention.

FIG. 1A shows an optical imaging lens system in accordance with a first embodiment of the present invention, and FIG. 1B shows the aberration curves of the first embodiment of the present invention. The optical imaging lens system of the first embodiment of the present invention mainly comprises five lens elements, in order from an object side to an image side:

a plastic first lens element 110 with positive refractive power having a convex object-side surface 111 and a convex image-side surface 112, the object-side and image-side surfaces 111 and 112 thereof being aspheric;

a plastic second lens element 120 with negative refractive power having a concave object-side surface 121 and a concave image-side surface 122, the object-side and image-side surfaces 121 and 122 thereof being aspheric;

a plastic third lens element 130 with positive refractive power having a convex object-side surface 131 and a concave image-side surface 132, the object-side and image-side surfaces 131 and 132 thereof being aspheric;

a plastic fourth lens element 140 with positive refractive power having a concave object-side surface 141 and a convex image-side surface 142, the object-side and image-side surfaces 141 and 142 thereof being aspheric; and a plastic fifth lens element 150 with negative refractive power having a concave object-side surface 151 and a concave image-side surface 152 on which at least one inflection point is formed, the object-side and image-side surfaces 151 and 152 thereof being aspheric;

wherein an aperture stop 100 is disposed between the first lens element 110 and the second lens element 120;

the optical imaging lens system further comprises an IR-filter 170 disposed between the image-side surface 152 of the fifth lens element 150 and an image plane 160; the IR-filter 170 is made of glass and has no influence on the focal length of the optical imaging lens system.

The equation of the aspheric surface profiles is expressed as follows:

$$X(Y) = (Y^2/R)/(1 + \text{sqrt}(1-(1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present optical imaging lens system, the focal length of the optical imaging lens system is f, and it satisfies the relation: f=5.80 (mm).

In the first embodiment of the present optical imaging lens system, the f-number of the optical imaging lens system is Fno, and it satisfies the relation: Fno=2.46.

In the first embodiment of the present optical imaging lens system, half of the maximal field of view of the optical imaging lens system is HFOV, and it satisfies the relation: HFOV=33.5 deg.

In the first embodiment of the present optical imaging lens system, the Abbe number of the first lens element 110 is V1, the Abbe number of the second lens element 120 is V2, and they satisfy the relation: V1−V2=32.5.

In the first embodiment of the present optical imaging lens system, the on-axis spacing between the second lens element 120 and the third lens element 130 is T23, the thickness of the second lens element on the optical axis 120 is CT2, and it satisfies the relation: T23/CT2=0.95.

In the first embodiment of the present optical imaging lens system, the thickness of the fourth lens element 140 on the optical axis is CT4, the thickness of the fifth lens element 150 on the optical axis is CT5, and it satisfies the relation: CT4/CT5=1.17.

In the first embodiment of the present optical imaging lens system, the radius of curvature of the object-side surface 111 of the first lens element 110 is R1, the radius of curvature of the image-side surface 112 of the first lens element 110 is R2, and they satisfy the relation: R1/R2=−0.08.

In the first embodiment of the present optical imaging lens system, the focal length of the optical imaging lens system is f, the focal length of the third lens element 130 is f3, and they satisfy the relation: f/f3=0.32.

In the first embodiment of the present optical imaging lens system, the focal length of the optical imaging lens system is f, the focal length of the first lens element 110 is f1, the focal length of the fourth lens element 140 is f4, and they preferably satisfy the relation: f/f1−f/f4=0.73.

In the first embodiment of the present optical imaging lens system, the focal length of the optical imaging lens system is f, the focal length of the fourth lens element 140 is f4, the focal length of the fifth lens element 150 is f5, and they satisfy the relation: |f/f4|+|f/f5|=2.38.

In the first embodiment of the present optical imaging lens system, the intersection of the image-side surface 142 of the fourth lens element 140 and the optical axis is T2, the farthest point of the effective light entry area on the image-side surface 142 of the fourth lens element 140 is P2, the distance on the optical axis between T2 and the vertical projection of P2 on the optical axis is SAG42, the vertical distance between P2 and the optical axis is Y42, and they preferably satisfy the relation: SAG42/Y42=0.56.

In the first embodiment of the present optical imaging lens system, the distance on the optical axis between the stop 100 and the electronic sensor is SL, the distance on the optical axis between the object-side surface 111 of the first lens element 100 and the electronic sensor is TTL, and they satisfy the relation: SL/TTL=0.84.

In the first embodiment of the present optical imaging lens system, the distance on the optical axis between the object-side surface 111 of the first lens element 110 and the electronic sensor is TTL, half of the diagonal length of the effective pixel area of the electronic sensor is ImgH, and they preferably satisfy the relation: TTL/ImgH=1.64.

The detailed optical data of the first embodiment is shown in FIG. 6 (TABLE 1), and the aspheric surface data is shown in FIG. 7A (TABLE 2A) and FIG. 7B (TABLE 2B), wherein the units of the radius of curvature, the thickness and the focal length are expressed in mm, and HFOV is half of the maximal field of view.

Embodiment 2

Figure 2A:
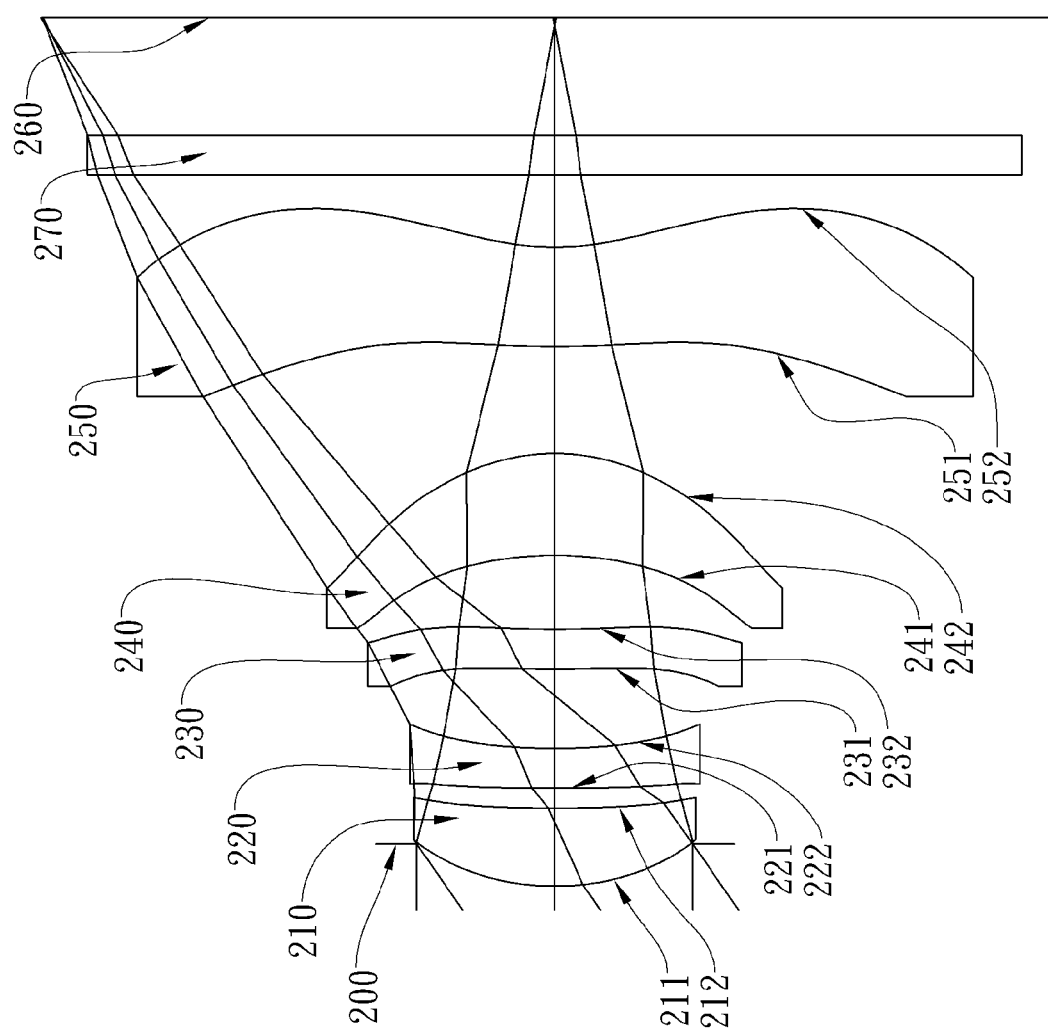
FIG. 2A shows an optical imaging lens system in accordance with a second embodiment of the present invention.
Figure 2B:
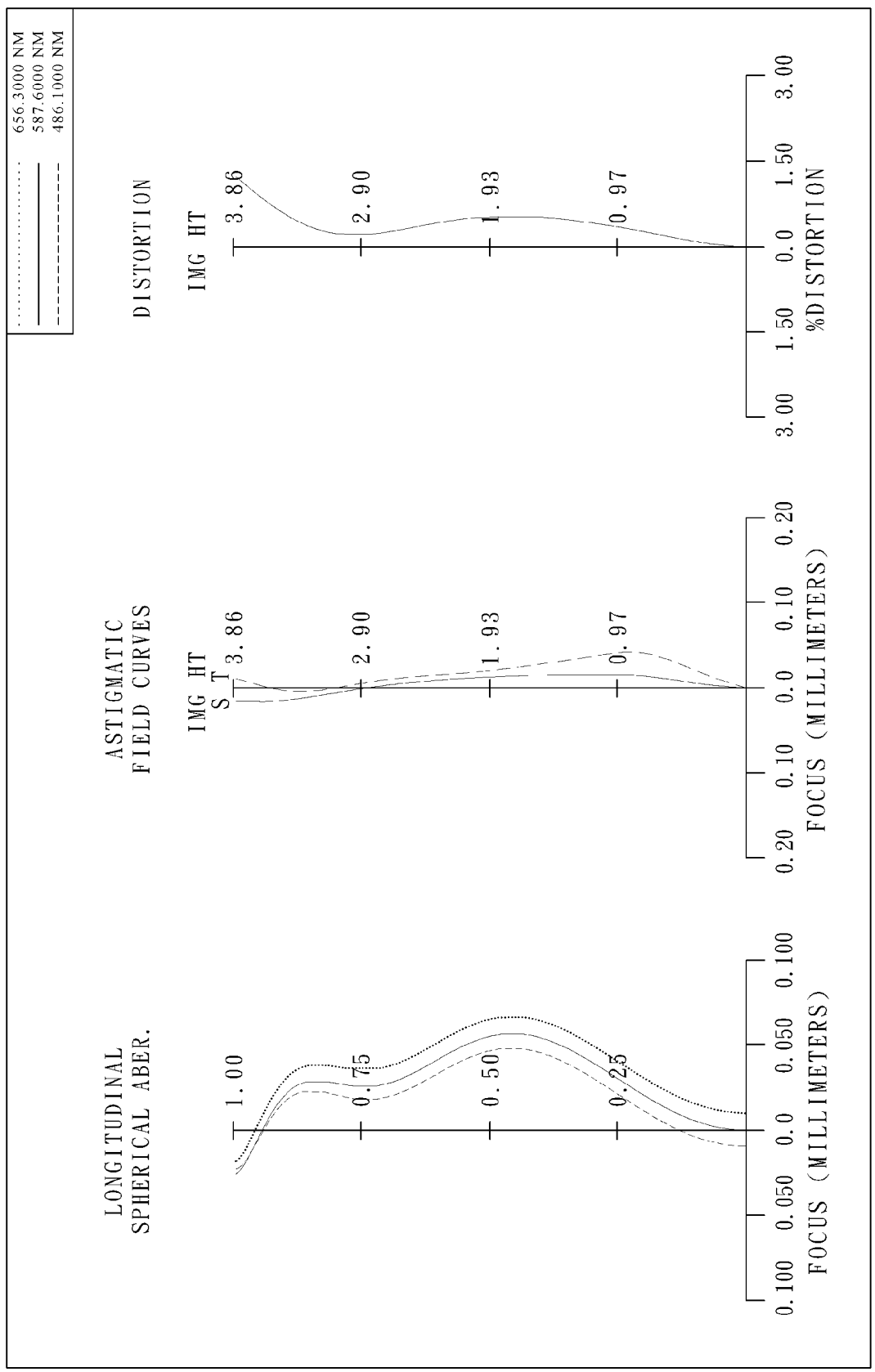
FIG. 2B shows the aberration curves of the second embodiment of the present invention.

FIG. 2A shows an optical imaging lens system in accordance with a second embodiment of the present invention, and FIG. 2B shows the aberration curves of the second embodiment of the present invention. The optical imaging lens system of the second embodiment of the present invention mainly comprises five lens elements, in order from an object side to an image side:

a plastic first lens element 210 with positive refractive power having a convex object-side surface 211 and a concave image-side surface 212, the object-side and image-side surfaces 211 and 212 thereof being aspheric;

a plastic second lens element 220 with negative refractive power having a convex object-side surface 221 and a concave image-side surface 222, the object-side and image-side surfaces 221 and 222 thereof being aspheric;

a plastic third lens element 230 with negative refractive power having a convex object-side surface 231 and a concave image-side surface 232, the object-side and image-side surfaces 231 and 232 thereof being aspheric;

a plastic fourth lens element 240 with positive refractive power having a concave object-side surface 241 and a convex image-side surface 242, the object-side and image-side surfaces 241 and 242 thereof being aspheric; and a plastic fifth lens element 250 with negative refractive power having a convex object-side surface 251 and a concave image-side surface 252 on which at least one inflection point is formed, the object-side and image-side surfaces 251 and 252 thereof being aspheric;

wherein an aperture stop 200 is disposed between the imaged object and first lens element 210;

the optical imaging lens system further comprises an IR-filter 270 disposed between the image-side surface 252 of the fifth lens element 250 and an image plane 260; the IR-filter 270 is made of glass and has no influence on the focal length of the optical imaging lens system.

The equation of the aspheric surface profiles of the second embodiment has the same form as that of the first embodiment.

In the second embodiment of the present optical imaging lens system, the focal length of the optical imaging lens system is f, and it satisfies the relation: f=5.60 (mm).

In the second embodiment of the present optical imaging lens system, the f-number of the optical imaging lens system is Fno, and it satisfies the relation: Fno=2.65

In the second embodiment of the present optical imaging lens system, half of the maximal field of view of the optical imaging lens system is HFOV, and it satisfies the relation: HFOV=34.5 deg.

In the second embodiment of the present optical imaging lens system, the Abbe number of the first lens element 210 is V1, the Abbe number of the second lens element 220 is V2, and they satisfy the relation: V1−V2=34.5.

In the second embodiment of the present optical imaging lens system, the on-axis spacing between the second lens element 220 and the third lens element 230 is T23, the thickness of the second lens element 220 on the optical axis is CT2, and it satisfies the relation: T23/CT2=1.99.

In the second embodiment of the present optical imaging lens system, the thickness of the fourth lens element 240 on the optical axis is CT4, the thickness of the fifth lens element 250 on the optical axis is CT5, and it satisfies the relation: CT4/CT5=1.03.

In the second embodiment of the present optical imaging lens system, the radius of curvature of the object-side surface 211 of the first lens element 210 is R1, the radius of curvature of the image-side surface 212 of the first lens element 210 is R2, and they satisfy the relation: R1/R2=0.17.

In the second embodiment of the present optical imaging lens system, the focal length of the optical imaging lens system is f, the focal length of the third lens element 230 is f3, and they satisfy the relation: f/f3=−0.12.

In the second embodiment of the present optical imaging lens system, the focal length of the optical imaging lens system is f, the focal length of the first lens element 210 is f1, the focal length of the fourth lens element 240 is f4, and they preferably satisfy the relation: f/f1−f/f4=0.28.

In the second embodiment of the present optical imaging lens system, the focal length of the optical imaging lens system is f, the focal length of the fourth lens element 240 is f4, the focal length of the fifth lens element 250 is f5, and they satisfy the relation: |f/f4|+|f/f5|=2.13.

In the second embodiment of the present optical imaging lens system, the intersection of the image-side surface 242 of the fourth lens element 240 and the optical axis is T2, the farthest point of the effective light entry area on the image-side surface 242 of the fourth lens element 240 is P2, the distance on the optical axis between T2 and the vertical projection of P2 on the optical axis is SAG42, the vertical distance between P2 and the optical axis is Y42, and they preferably satisfy the relation: SAG42/Y42=0.59.

In the second embodiment of the present optical imaging lens system, the distance on the optical axis between the stop 200 and the electronic sensor is SL, the distance on the optical axis between the object-side surface 211 of the first lens element 200 and the electronic sensor is TTL, and they satisfy the relation: SL/TTL=0.95.

In the second embodiment of the present optical imaging lens system, the distance on the optical axis between the object-side surface 211 of the first lens element 210 and the electronic sensor is TTL, half of the diagonal length of the effective pixel area of the electronic sensor is ImgH, and they preferably satisfy the relation: TTL/ImgH=1.67.

The detailed optical data of the second embodiment is shown in FIG. 8 (TABLE 3), and the aspheric surface data is shown in FIG. 9A (TABLE 4A) and FIG. 9B (TABLE 4B), wherein the units of the radius of curvature, the thickness and the focal length are expressed in mm, and HFOV is half of the maximal field of view.

Embodiment 3

Figure 3A:
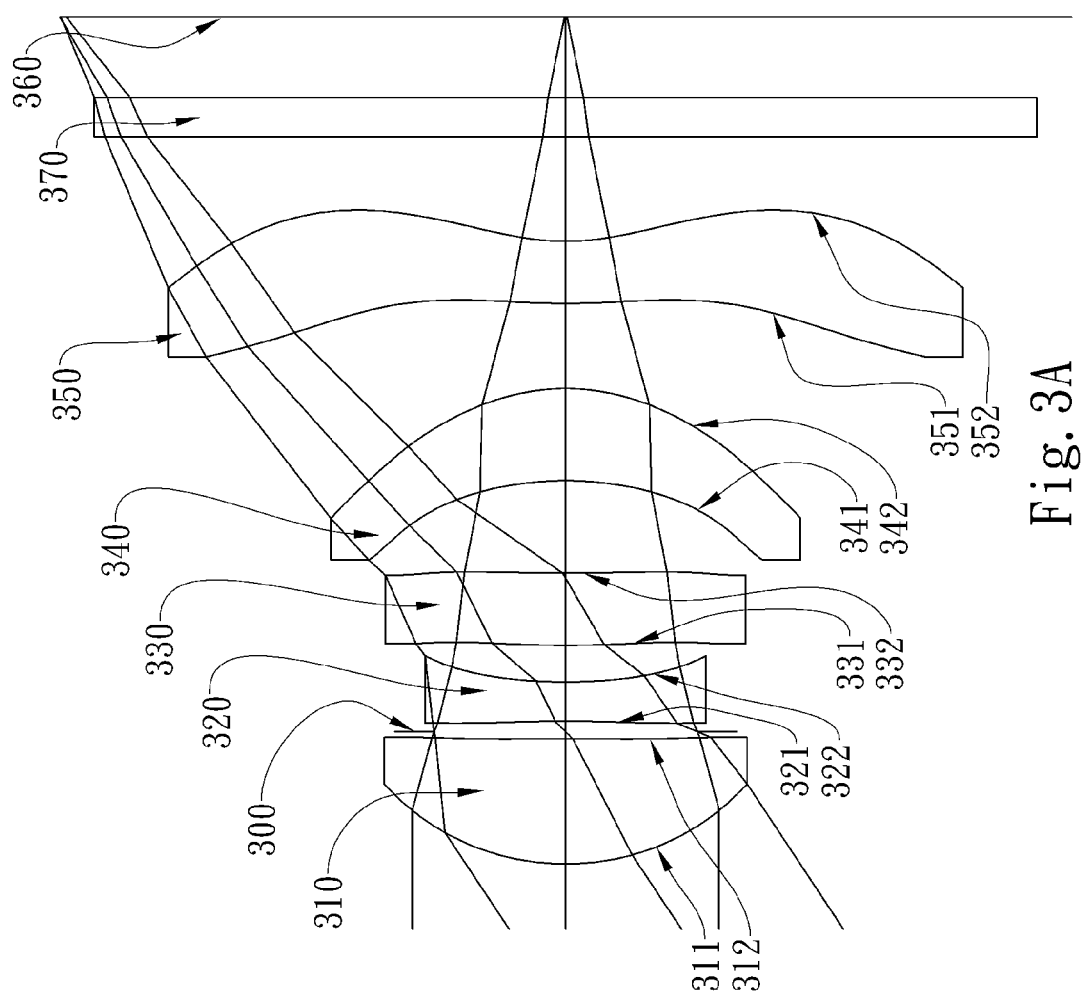
FIG. 3A shows an optical imaging lens system in accordance with a third embodiment of the present invention.
Figure 3B:
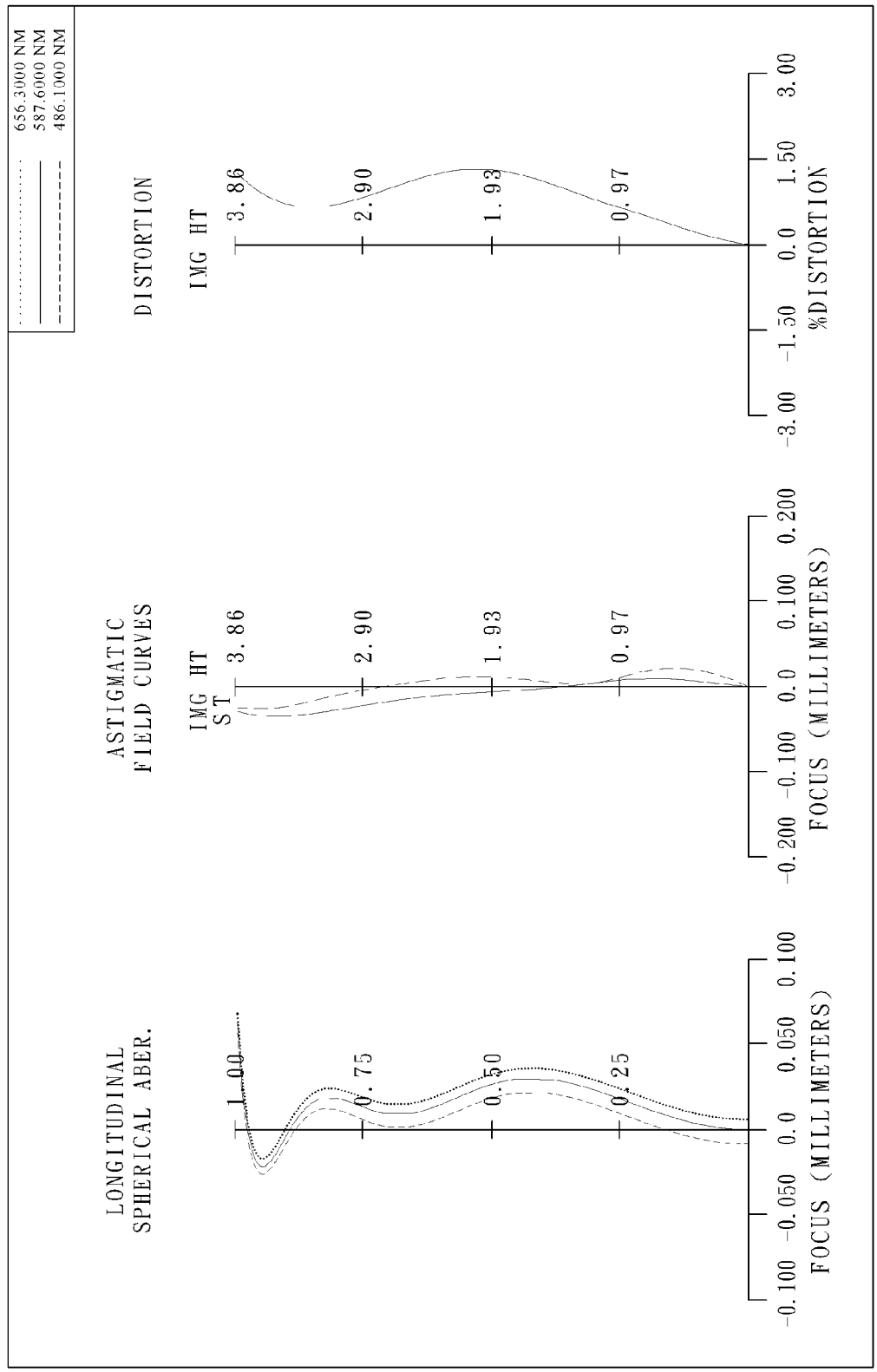
FIG. 3B shows the aberration curves of the third embodiment of the present invention.

FIG. 3A shows an optical imaging lens system in accordance with a third embodiment of the present invention, and FIG. 3B shows the aberration curves of the third embodiment of the present invention. The optical imaging lens system of the third embodiment of the present invention mainly comprises five lens elements, in order from an object side to an image side:

a plastic first lens element 310 with positive refractive power having a convex object-side surface 311 and a convex image-side surface 312, the object-side and image-side surfaces 311 and 312 thereof being aspheric;

a plastic second lens element 320 with negative refractive power having a concave object-side surface 321 and a concave image-side surface 322, the object-side and image-side surfaces 321 and 322 thereof being aspheric;

a plastic third lens element 330 with positive refractive power having a convex object-side surface 331 and a concave image-side surface 332, the object-side and image-side surfaces 331 and 332 thereof being aspheric;

a plastic fourth lens element 340 with positive refractive power having a concave object-side surface 341 and a convex image-side surface 342, the object-side and image-side surfaces 341 and 342 thereof being aspheric; and a plastic fifth lens element 350 with negative refractive power having a convex object-side surface 351 and a concave image-side surface 352 on which at least one inflection point is formed, the object-side and image-side surfaces 351 and 352 thereof being aspheric;

wherein an aperture stop 300 is disposed between the first lens element 310 and the second lens element 320;

the optical imaging lens system further comprises an IR-filter 370 disposed between the image-side surface 352 of the fifth lens element 350 and an image plane 360; the IR-filter 370 is made of glass and has no influence on the focal length of the optical imaging lens system.

The equation of the aspheric surface profiles of the third embodiment has the same form as that of the first embodiment.

In the third embodiment of the present optical imaging lens system, the focal length of the optical imaging lens system is f, and it satisfies the relation: f=5.80 (mm).

In the third embodiment of the present optical imaging lens system, the f-number of the optical imaging lens system is Fno, and it satisfies the relation: Fno=2.45.

In the third embodiment of the present optical imaging lens system, half of the maximal field of view of the optical imaging lens system is HFOV, and it satisfies the relation: HFOV=33.5 deg.

In the third embodiment of the present optical imaging lens system, the Abbe number of the first lens element 310 is V1, the Abbe number of the second lens element 320 is V2, and they satisfy the relation: V1−V2=32.5.

In the third embodiment of the present optical imaging lens system, the on-axis spacing between the second lens element 320 and the third lens element 330 is T23, the thickness of the second lens element 320 on the optical axis is CT2, and it satisfies the relation: T23/CT2=0.93.

In the third embodiment of the present optical imaging lens system, the thickness of the fourth lens element 340 on the optical axis is CT4, the thickness of the fifth lens element 350 on the optical axis is CT5, and it satisfies the relation: CT4/CT5=1.48.

In the third embodiment of the present optical imaging lens system, the radius of curvature of the object-side surface 311 of the first lens element 310 is R1, the radius of curvature of the image-side surface 312 of the first lens element 310 is R2, and they satisfy the relation: R1/R2=−0.04.

In the third embodiment of the present optical imaging lens system, the focal length of the optical imaging lens system is f, the focal length of the third lens element 330 is f3, and they satisfy the relation: f/f3=0.30.

In the third embodiment of the present optical imaging lens system, the focal length of the optical imaging lens system is f, the focal length of the first lens element 310 is f1, the focal length of the fourth lens element 340 is f4, and they preferably satisfy the relation: f/f1−f/f4=0.77.

In the third embodiment of the present optical imaging lens system, the focal length of the optical imaging lens system is f, the focal length of the fourth lens element 340 is f4, the focal length of the fifth lens element 350 is f5, and they satisfy the relation: |f/f4|+|f/f5|=2.05.

In the third embodiment of the present optical imaging lens system, the intersection of the image-side surface 342 of the fourth lens element 340 and the optical axis is T2, the farthest point of the effective light entry area on the image-side surface 342 of the fourth lens element 340 is P2, the distance on the optical axis between T2 and the vertical projection of P2 on the optical axis is SAG42, the vertical distance between P2 and the optical axis is Y42, and they preferably satisfy the relation: SAG42/Y42=0.56.

In the third embodiment of the present optical imaging lens system, the distance on the optical axis between the stop 300 and the electronic sensor is SL, the distance on the optical axis between the object-side surface 311 of the first lens element 300 and the electronic sensor is TTL, and they satisfy the relation: SL/TTL=0.84.

In the third embodiment of the present optical imaging lens system, the distance on the optical axis between the object-side surface 311 of the first lens element 310 and the electronic sensor is TTL, half of the diagonal length of the effective pixel area of the electronic sensor is ImgH, and they preferably satisfy the relation: TTL/ImgH=1.65.

The detailed optical data of the third embodiment is shown in FIG. 10 (TABLE 5), and the aspheric surface data is shown in FIG. 11A (TABLE 6A) and FIG. 11B (TABLE 6B), wherein the units of the radius of curvature, the thickness and the focal length are expressed in mm, and HFOV is half of the maximal field of view.

Embodiment 4

Figure 4A:
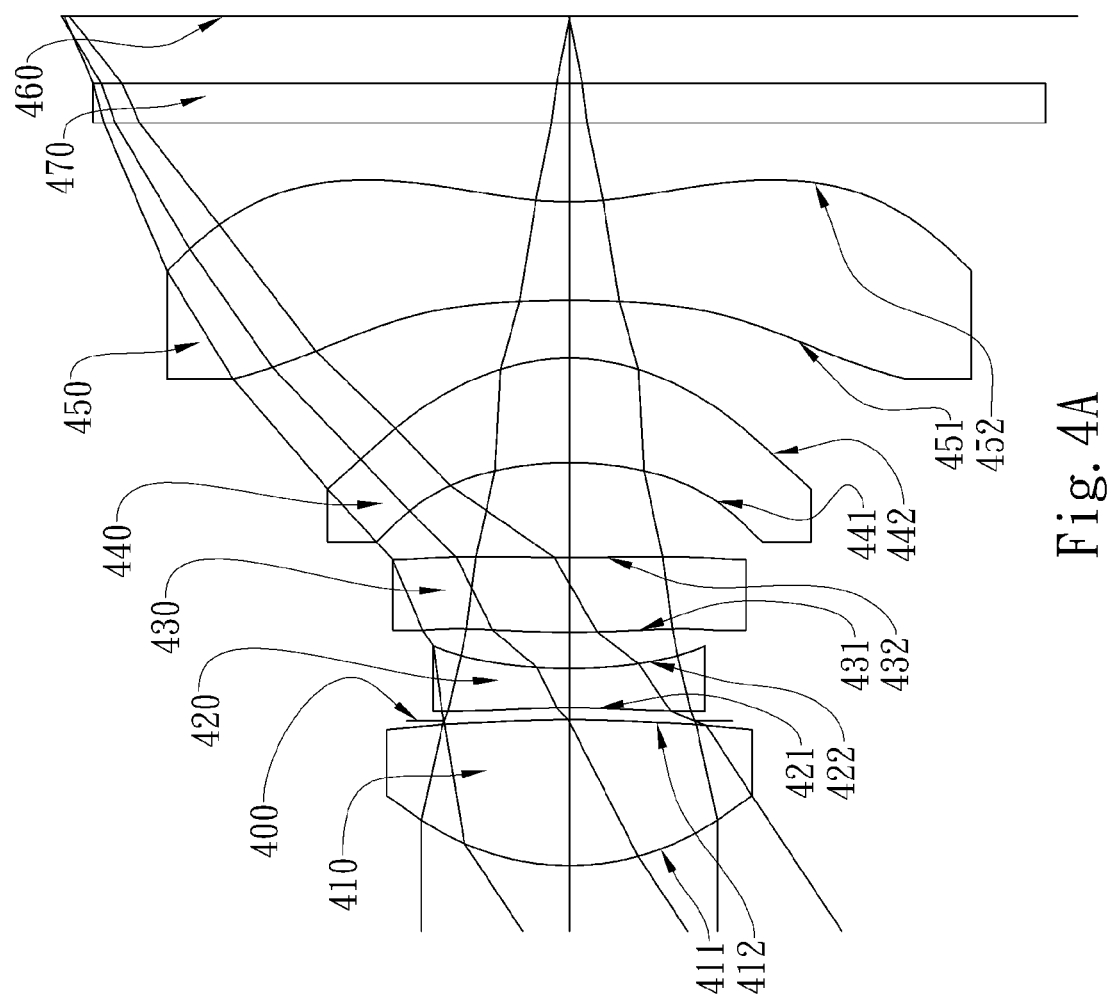
FIG. 4A shows an optical imaging lens system in accordance with a fourth embodiment of the present invention.
Figure 4B:
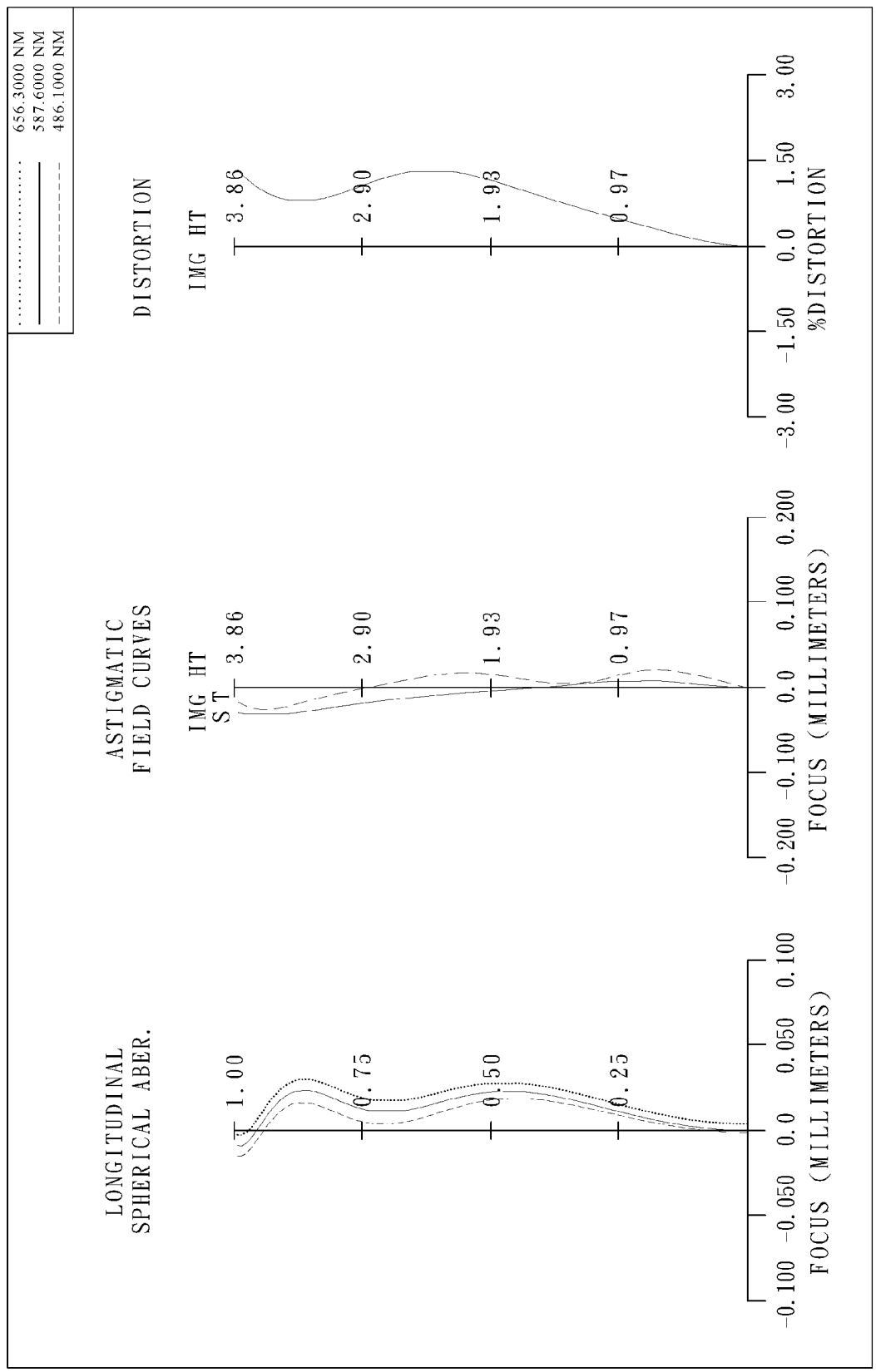
FIG. 4B shows the aberration curves of the fourth embodiment of the present invention.

FIG. 4A shows an optical imaging lens system in accordance with a fourth embodiment of the present invention and FIG. 4B shows the aberration curves of the fourth embodiment of the present invention. The optical imaging lens system of the fourth embodiment of the present invention mainly comprises five lens elements, in order from an object side to an image side:

a plastic first lens element 410 with positive refractive power having a convex object-side surface 411 and a convex image-side surface 412, the object-side and image-side surfaces 411 and 412 thereof being aspheric;

a plastic second lens element 420 with negative refractive power having a concave object-side surface 421 and a concave image-side surface 422, the object-side and image-side surfaces 421 and 422 thereof being aspheric;

a plastic third lens element 430 with positive refractive power having a convex object-side surface 431 and a concave image-side surface 432, the object-side and image-side surfaces 431 and 432 thereof being aspheric;

a plastic fourth lens element 440 with positive refractive power having a concave object-side surface 441 and a convex image-side surface 442, the object-side and image-side surfaces 441 and 442 thereof being aspheric; and a plastic fifth lens element 450 with negative refractive power having a concave object-side surface 451 and a concave image-side surface 452 on which at least one inflection point is formed, the object-side and image-side surfaces 451 and 452 thereof being aspheric;

wherein an aperture stop 400 is disposed between the first lens element 410 and the second lens element 420;

the optical imaging lens system further comprises an IR-filter 470 disposed between the image-side surface 452 of the fifth lens element 450 and an image plane 460; the IR-filter 470 is made of glass and has no influence on the focal length of the optical imaging lens system.

The equation of the aspheric surface profiles of the fourth embodiment has the same form as that of the first embodiment.

In the fourth embodiment of the present optical imaging lens system, the focal length of the optical imaging lens system is f, and it satisfies the relation: f=5.81 (mm).

In the fourth embodiment of the present optical imaging lens system, the f-number of the optical imaging lens system is Fno, and it satisfies the relation: Fno=2.55.

In the fourth embodiment of the present optical imaging lens system, half of the maximal field of view of the optical imaging lens system is HFOV, and it satisfies the relation: HFOV=33.5 deg.

In the fourth embodiment of the present optical imaging lens system, the Abbe number of the first lens element 410 is V1, the Abbe number of the second lens element 420 is V2, and they satisfy the relation: V1−V2=32.1

In the fourth embodiment of the present optical imaging lens system, the on-axis spacing between the second lens element 420 and the third lens element 430 is T23, the thickness of the second lens element 420 on the optical axis is CT2, and it satisfies the relation: T23/CT2=0.92.

In the fourth embodiment of the present optical imaging lens system, the thickness of the fourth lens element 440 on the optical axis is CT4, the thickness of the fifth lens element 450 on the optical axis is CT5, and it satisfies the relation: CT4/CT5=1.06.

In the fourth embodiment of the present optical imaging lens system, the radius of curvature of the object-side surface 411 of the first lens element 410 is R1, the radius of curvature of the image-side surface 412 of the first lens element 410 is R2, and they satisfy the relation: R1/R2=−0.26.

In the fourth embodiment of the present optical imaging lens system, the focal length of the optical imaging lens system is f, the focal length of the third lens element 430 is f3, and they satisfy the relation: f/f3=0.39.

In the fourth embodiment of the present optical imaging lens system, the focal length of the optical imaging lens system is f, the focal length of the first lens element 410 is f1, the focal length of the fourth lens element 440 is f4, and they preferably satisfy the relation: f/f1−f/f4=0.90.

In the fourth embodiment of the present optical imaging lens system, the focal length of the optical imaging lens system is f, the focal length of the fourth lens element 440 is f4, the focal length of the fifth lens element 450 is f5, and they satisfy the relation: |f/f4|+|f/f5|=2.55.

In the fourth embodiment of the present optical imaging lens system, the intersection of the image-side surface 442 of the fourth lens element 440 and the optical axis is T2, the farthest point of the effective light entry area on the image-side surface 442 of the fourth lens element 440 is P2, the distance on the optical axis between T2 and the vertical projection of P2 on the optical axis is SAG42, the vertical distance between P2 and the optical axis is Y42, and they preferably satisfy the relation: SAG42/Y42=0.54.

In the fourth embodiment of the present optical imaging lens system, the distance on the optical axis between the stop 400 and the electronic sensor is SL, the distance on the optical axis between the object-side surface 411 of the first lens element 400 and the electronic sensor is TTL, and they satisfy the relation: SL/TTL=0.83.

In the fourth embodiment of the present optical imaging lens system, the distance on the optical axis between the object-side surface 411 of the first lens element 410 and the electronic sensor is TTL, half of the diagonal length of the effective pixel area of the electronic sensor is ImgH, and they preferably satisfy the relation: TTL/ImgH=1.65.

The detailed optical data of the fourth embodiment is shown in FIG. 12 (TABLE 7), and the aspheric surface data is shown in FIG. 13A (TABLE 8A) and FIG. 13B (TABLE 8B), wherein the units of the radius of curvature, the thickness and the focal length are expressed in mm, and HFOV is half of the maximal field of view.

Embodiment 5

Figure 5A:
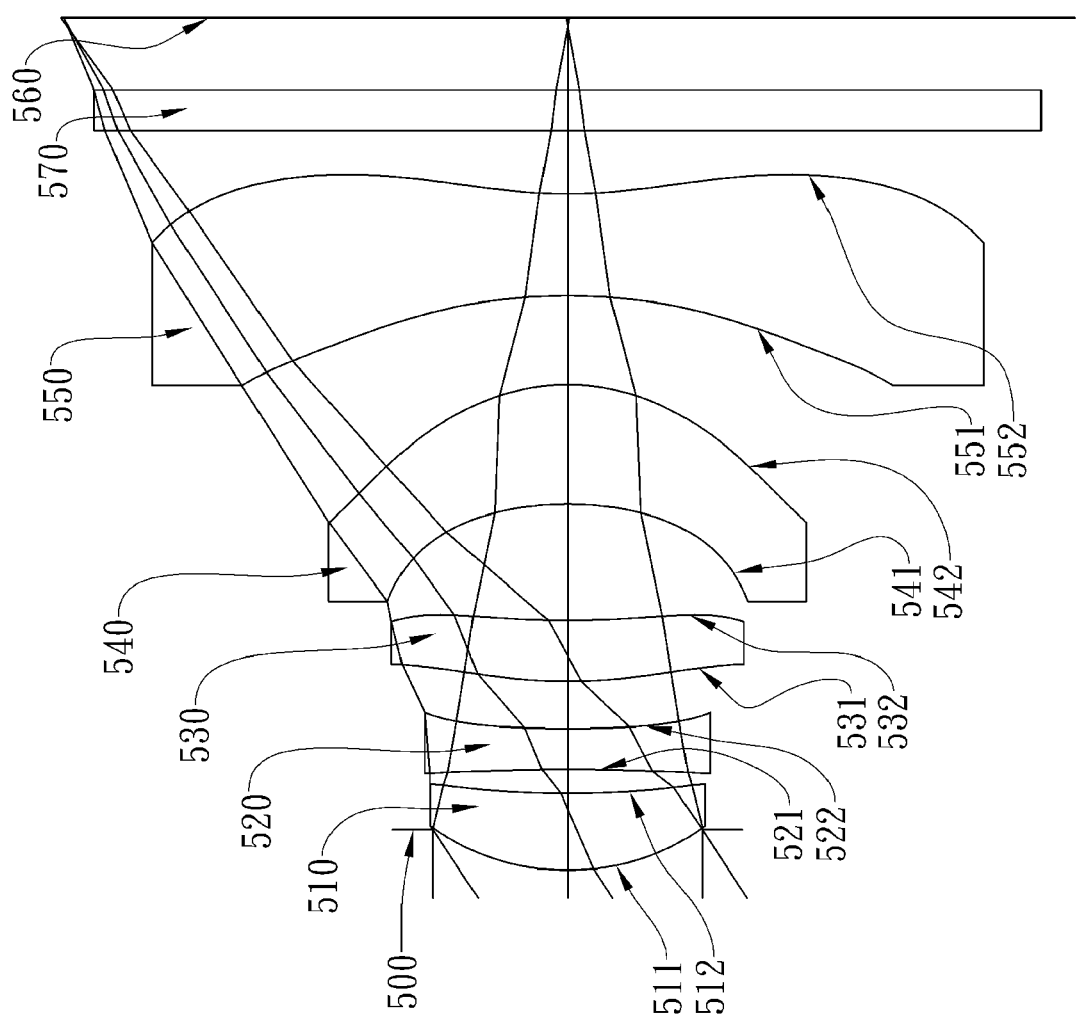
FIG. 5A shows an optical imaging lens system in accordance with a fifth embodiment of the present invention.
Figure 5B:
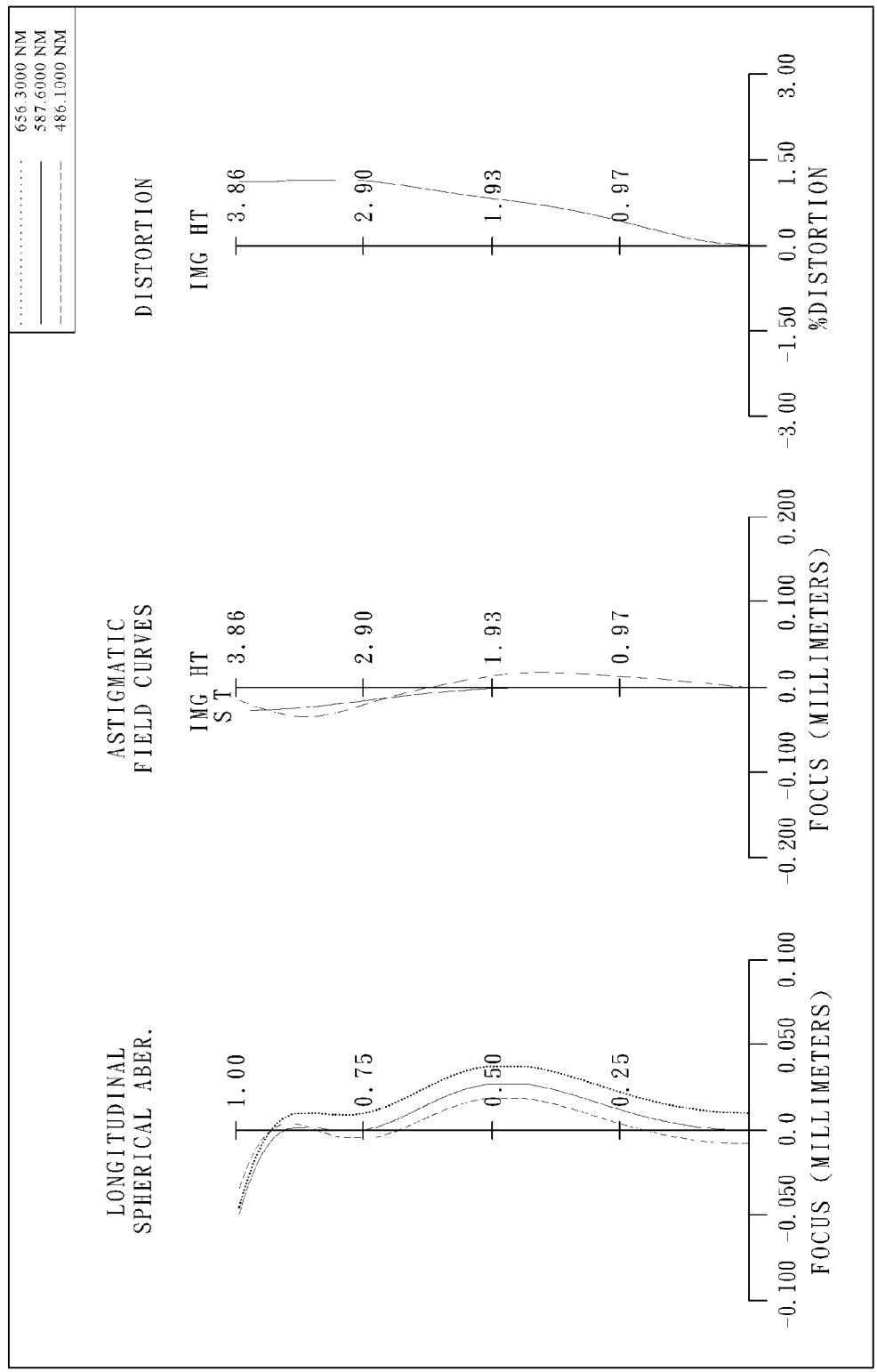
FIG. 5B shows the aberration curves of the fifth embodiment of the present invention.
Figure 17:
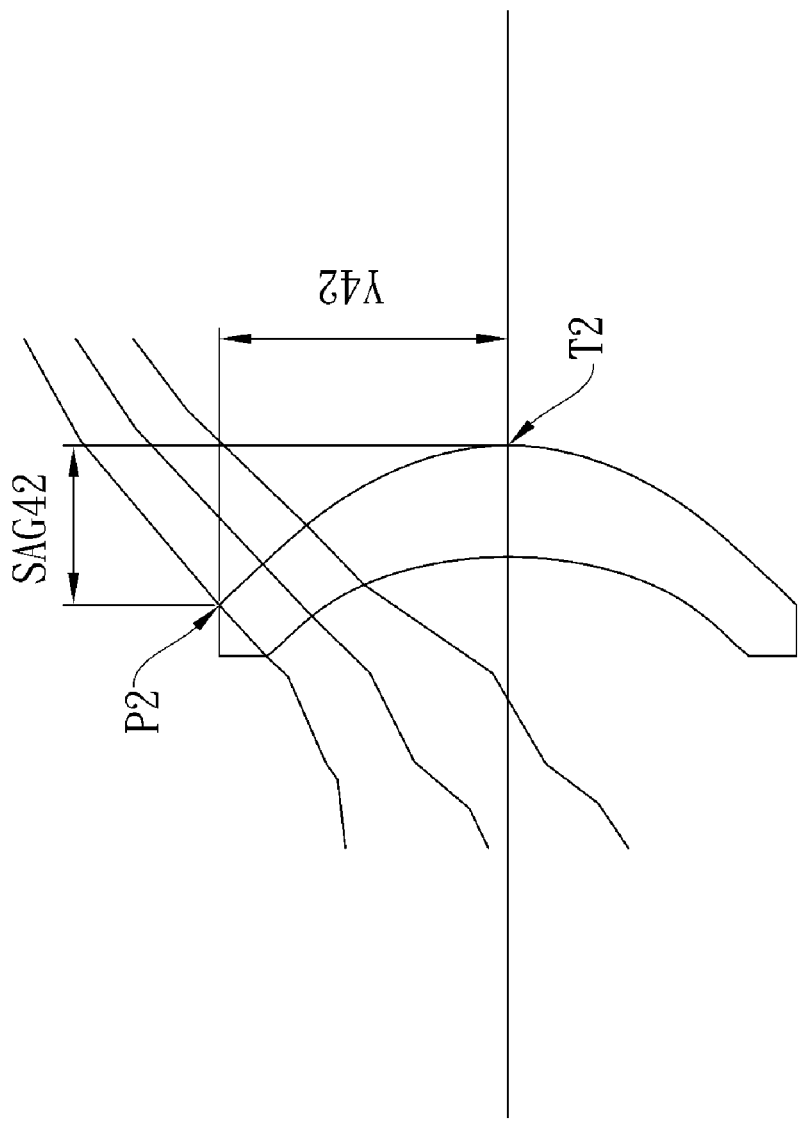
FIG. 17 shows the distances and relative locations represented by Y42 and SAG42.

FIG. 5A shows an optical imaging lens system in accordance with a fifth embodiment of the present invention, and FIG. 5B shows the aberration curves of the fifth embodiment of the present invention. The optical imaging lens system of the fifth embodiment of the present invention mainly comprises five lens elements, in order from an object side to an image side:

a plastic first lens element 510 with positive refractive power having a convex object-side surface 511 and a concave image-side surface 512, the object-side and image-side surfaces 511 and 512 thereof being aspheric;

a plastic second lens element 520 with negative refractive power having a concave object-side surface 521 and a concave image-side surface 522, the object-side and image-side surfaces 521 and 522 thereof being aspheric;

a plastic third lens element 530 with positive refractive power having a convex object-side surface 531 and a concave image-side surface 532, the object-side and image-side surfaces 531 and 532 thereof being aspheric;

a plastic fourth lens element 540 with positive refractive power having a concave object-side surface 541 and a convex image-side surface 542, the object-side and image-side surfaces 541 and 542 thereof being aspheric; and a plastic fifth lens element 550 with negative refractive power having a concave object-side surface 551 and a concave image-side surface 552 on which at least one inflection point is formed, the object-side and image-side surfaces 551 and 552 thereof being aspheric;

wherein an aperture stop 500 is disposed between the imaged object and the first lens element 510;

the optical imaging lens system further comprises an IR-filter 570 disposed between the image-side surface 552 of the fifth lens element 550 and an image plane 560; the IR-filter 570 is made of glass and has no influence on the focal length of the optical imaging lens system.

The equation of the aspheric surface profiles of the fifth embodiment has the same form as that of the first embodiment.

In the fifth embodiment of the present optical imaging lens system, the focal length of the optical imaging lens system is f, and it satisfies the relation: f=5.59 (mm).

In the fifth embodiment of the present optical imaging lens system, the f-number of the optical imaging lens system is Fno, and it satisfies the relation: Fno=2.80.

In the fifth embodiment of the present optical imaging lens system, half of the maximal field of view of the optical imaging lens system is HFOV, and it satisfies the relation: HFOV=33.4 deg.

In the fifth embodiment of the present optical imaging lens system, the Abbe number of the first lens element 510 is V1, the Abbe number of the second lens element 520 is V2, and they satisfy the relation: V1−V2=34.5.

In the fifth embodiment of the present optical imaging lens system, the on-axis spacing between the second lens element 520 and the third lens element 530 is T23, the thickness of the second lens element 520 on the optical axis is CT2, and it satisfies the relation: T23/CT2=1.16.

In the fifth embodiment of the present optical imaging lens system, the thickness of the fourth lens element 540 on the optical axis is CT4, the thickness of the fifth lens element 550 on the optical axis is CT5, and it satisfies the relation: CT4/CT5=1.17.

In the fifth embodiment of the present optical imaging lens system, the radius of curvature of the object-side surface 511 of the first lens element 510 is R1, the radius of curvature of the image-side surface 512 of the first lens element 510 is R2, and they satisfy the relation: R1/R2=0.24.

In the fifth embodiment of the present optical imaging lens system, the focal length of the optical imaging lens system is f, the focal length of the third lens element 530 is f3, and they satisfy the relation: f/f3=0.44.

In the fifth embodiment of the present optical imaging lens system, the focal length of the optical imaging lens system is f, the focal length of the first lens element 510 is f1, the focal length of the fourth lens element 540 is f4, and they preferably satisfy the relation: f/f1−f/f4=0.30.

In the fifth embodiment of the present optical imaging lens system, the focal length of the optical imaging lens system is f, the focal length of the fourth lens element 540 is f4, the focal length of the fifth lens element 550 is f5, and they satisfy the relation: |f/f4|+|f/f5|=2.64.

In the fifth embodiment of the present optical imaging lens system, the intersection of the image-side surface 542 of the fourth lens element 540 and the optical axis is T2, the farthest point of the effective light entry area on the image-side surface 542 of the fourth lens element 540 is P2, the distance on the optical axis between T2 and the vertical projection of P2 on the optical axis is SAG42, the vertical distance between P2 and the optical axis is Y42, and they preferably satisfy the relation: SAG42/Y42=0.58.

In the fifth embodiment of the present optical imaging lens system, a distance on the optical axis between the stop 500 and the electronic sensor is SL, a distance on the optical axis between the object-side surface 511 of the first lens element 500 and the electronic sensor is TTL, and they satisfy the relation: SL/TTL=0.95.

In the fifth embodiment of the present optical imaging lens system, the distance on the optical axis between the object-side surface 511 of the first lens element 510 and the electronic sensor is TTL, half of the diagonal length of the effective pixel area of the electronic sensor is ImgH, and they preferably satisfy the relation: TTL/ImgH=1.67.

The detailed optical data of the fifth embodiment is shown in FIG. 14 (TABLE 9), and the aspheric surface data is shown in FIG. 15 (TABLE 10), wherein the units of the radius of curvature, the thickness and the focal length are expressed in mm, and HFOV is half of the maximal field of view.

It is to be noted that TABLES 1-10 (illustrated in FIGS. 5-15 respectively) show different data of the different embodiments, however, the data of the different embodiments are obtained from experiments. Therefore, any optical imaging lens system of the same structure is considered to be within the scope of the present invention even if it uses different data. The embodiments depicted above and the appended drawings are exemplary and are not intended to limit the scope of the present invention. TABLE 11 (illustrated in FIG. 16) shows the data of the respective embodiments resulting from the equations.

What is claimed is:

1. An optical imaging lens system comprising five lens elements with refractive power, in order from an object side to an image side:
    a first lens element with positive refractive power having a convex object-side surface;
    a second lens element with negative refractive power;
    a third lens element having a convex object-side surface and a concave image-side surface;
    a fourth lens element having both surface being aspheric; and
    a fifth lens element having a concave image-side surface with at least one inflection point formed thereon;
    wherein the optical imaging lens system further comprises a stop and an electronic sensor on which an object is imaged;
    wherein a focal length of the optical imaging lens system is f, a focal length of the first lens element is f1, a focal length of the fourth lens element is f4, a thickness of the fourth lens element on the optical axis is CT4, a thickness of the fifth lens element on the optical axis is CT5, a distance on the optical axis between the stop and the electronic sensor is SL, a distance on the optical axis between the object-side surface of the first lens element and the electronic sensor is TTL, and they satisfy the relation:

$0.28 \leq f/f1 - f/f4 < 1.5;$ $0.8 < CT4/CT5 < 1.5;$ and $0.7 < SL/TTL < 1.1.$

2. The optical imaging lens system according to claim 1, wherein the object-side and image-side surfaces of the third lens element are both aspheric, and the fourth lens element has a concave object-side surface and a convex image-side surface.

3. The optical imaging lens system according to claim 2, wherein an Abbe number of the first lens element is V1, an Abbe number of the second lens element is V2, and they satisfy the relation:

$30 < V1 - V2 < 42.$

4. The optical imaging lens system according to claim 3, wherein an on-axis spacing between the second lens element and the third lens element is T23, a thickness of the second lens element on the optical axis is CT2, and they satisfy the relation:

$0.9 < T23/CT2 < 2.0.$

5. The optical imaging lens system according to claim 2, wherein the distance on the optical axis between the object-side surface of the first lens element and the electronic sensor is TTL, half of the diagonal length of the effective pixel area of the electronic sensor is ImgH, and they satisfy the relation:

$TTL/ImgH < 1.80.$

6. The optical imaging lens system according to claim 2, wherein at least one inflection point is formed on at least one surface of the object-side and image-side surfaces of the third lens elements, and the third and fifth lens elements are made of plastic.

7. The optical imaging lens system according to claim 6, wherein the second lens element has a concave image-side surface.

8. The optical imaging lens system according to claim 7, wherein the focal length of the optical imaging lens system is f, a focal length of the third lens element is f3, and they satisfy the relation:

$-0.5 < f/f3 < 0.6.$

9. The optical imaging lens system according to claim 8, wherein an air clearance exists between each lens element, and the focal length of the optical imaging lens system is f, the focal length of the third lens element is f3, and they satisfy the relation:

$-0.2 < f/f3 < 0.5.$

10. The optical imaging lens system according to claim 9, wherein a radius of curvature of the object-side surface of the first lens element is R1, a radius of curvature of the image-side surface of the first lens element is R2, and they satisfy the relation:

$-0.3 < R1/R2 < 0.3.$

11. The optical imaging lens system according to claim 8, wherein the distance on the optical axis between the stop and the electronic sensor is SL, the distance on the optical axis between the object-side surface of the first lens element and the electronic sensor is TTL, and they satisfy the relation:

$0.8<SL/TTL<1.0$.

12. The optical imaging lens system according to claim 11, wherein the focal length of the optical imaging lens system is f, the focal length of the fourth lens element is f4, a focal length of the fifth lens element is f5, and they satisfy the relation:

$1.8<|f/f4|+|f/f5|<3.0$.

13. The optical imaging lens system according to claim 8, the intersection of the image-side surface of the fourth lens element and the optical axis is T2, the farthest point of the effective light entry area on the image-side surface of the fourth lens element is P2, the distance on the optical axis between T2 and the vertical projection of P2 on the optical axis is SAG42, the vertical distance between P2 and the optical axis is Y42, and they satisfy the relation:

$0.4<SAG42/Y42<0.7$.

14. An optical imaging lens system comprising five lens elements with refractive power, in order from an object side to an image side:
   a first lens element with positive refractive power having a convex object-side surface;
   a second lens element with negative refractive power;
   a third lens element having a concave image-side surface;
   a fourth lens element with positive refractive power, at least one of the object-side and image-side surfaces thereof being aspheric; and
   a fifth lens element with negative refractive power having a concave image-side surface, and at least one of the object-side and image-side surfaces thereof being aspheric;
   wherein the optical imaging lens system further comprises a stop and an electronic sensor on which an object is imaged;
   wherein a focal length of the optical imaging lens system is f, a focal length of the fourth lens element is f4, a focal length of the fifth lens element is f5, an on-axis spacing between the second lens element and the third lens element is T23, a thickness of the second lens element on the optical axis is CT2, a distance on the optical axis between the stop and the electronic sensor is SL, a distance on the optical axis between the object-side surface of the first lens element and the electronic sensor is TTL, and they satisfy the relation:

$1.8<|f/f4|+|f/f5|<3.0$;

$1.16 \leq T23/CT2<2.5$; and $0.7<SL/TTL<1.1$.

15. The optical imaging lens system according to claim 14, wherein the focal length of the optical imaging lens system is f, a focal length of the third lens element is f3, and they satisfy the relation:

$-0.5<f/f3<0.6$.

16. The optical imaging lens system according to claim 15, wherein the third lens element has a convex object-side surface, and at least one inflection point is formed on at least one of the object-side and image-side surfaces of the fifth lens element.

17. The optical imaging lens system according to claim 16, wherein at least one inflection point is formed on at least one of the object-side and image-side surfaces of the third lens element, the fourth lens element has a concave object-side surface and a convex image-side surface, and the fifth lens element is made of plastic.

18. The optical imaging lens system according to claim 17, wherein a thickness of the fourth lens element on the optical axis is CT4, a thickness on the optical axis of the fifth lens element is CT5, and they satisfy the relation:

$0.8<CT4/CT5<1.5$.

19. The optical imaging lens system according to claim 17, wherein the focal length of the optical imaging lens system is f, the focal length of the third lens element is f3, and they satisfy the relation:

$-0.2<f/f3<0.5$.

20. The optical imaging lens system according to claim 17, the intersection of the image-side surface of the fourth lens element and the optical axis is T2, the farthest point of the effective light entry area on the image-side surface of the fourth lens element is P2, the distance on the optical axis between T2 and the vertical projection of P2 on the optical axis is SAG42, the vertical distance between P2 and the optical axis is Y42, and they satisfy the relation:

$0.4<SAG42/Y42<0.7$.

21. The optical imaging lens system according to claim 17, wherein the focal length of the optical imaging lens system is f, a focal length of the first lens element is f1, the focal length of the fourth lens element is f4, and they satisfy the relation:

$0<f/f1-f/f4<1.5$.

* * * * *